US012591510B2

(12) United States Patent
Hoeben

(10) Patent No.: US 12,591,510 B2
(45) Date of Patent: Mar. 31, 2026

(54) SYSTEMS AND METHODS OF ALLOCATING GPU MEMORY

(71) Applicant: ACTIVEVIDEO NETWORKS, LLC., Claremont, NC (US)

(72) Inventor: Maarten Hoeben, San Jose, CA (US)

(73) Assignee: ACTIVEVIDEO NETWORKS, LLC., Claremont, CA (US)

( * ) Notice: Subject to any disclaimer, the term of this patent is extended or adjusted under 35 U.S.C. 154(b) by 0 days.

(21) Appl. No.: 18/868,114

(22) PCT Filed: May 23, 2023

(86) PCT No.: PCT/US2023/023193
§ 371 (c)(1),
(2) Date: Nov. 21, 2024

(87) PCT Pub. No.: WO2023/230033
PCT Pub. Date: Nov. 30, 2023

(65) Prior Publication Data
US 2025/0328459 A1 Oct. 23, 2025

Related U.S. Application Data

(60) Provisional application No. 63/346,780, filed on May 27, 2022.

(51) Int. Cl.
*G06F 12/02* (2006.01)
*G06F 9/50* (2006.01)

(52) U.S. Cl.
CPC .......... *G06F 12/023* (2013.01); *G06F 9/5016* (2013.01); *G06F 2212/1008* (2013.01)

(58) Field of Classification Search
None
See application file for complete search history.

(56) References Cited

U.S. PATENT DOCUMENTS 8,984,167 B1 * 3/2015 Diard ...................... H04L 69/04
709/206
10,846,096 B1 11/2020 Chung et al.
(Continued)

OTHER PUBLICATIONS

Lin et al. "A New Non-Blocking Approach on GPU Dynamical Memory Management." In: International Workshop on Computational Science and Engineering, Oct. 14-17, 2013, [online] [retrived on Jul. 26, 2023] Retrieved from the Internet < URL: https://pos.sissa.it/202/071/ >, entire document.
(Continued)

*Primary Examiner* — Kaushikkumar M Patel
(74) *Attorney, Agent, or Firm* — Chernoff, Vilhauer, McClung & Stenzel, LLP

(57) ABSTRACT

The server, initializes, for a third-party application executing on the server, an entirety of available GPU memory of a client device, including pre-allocating a plurality of blocks of GPU memory. During execution of the third-party application, the server receives a first request from the third-party application to store first data in the GPU memory of the client device, and, in response to the first request, frees a portion of a respective pre-allocated block of the plurality of pre-allocated blocks of GPU memory and stores the first data in the portion of the respective pre-allocated block. The server pre-allocates a new block of GPU memory of the client device, the new block comprising a complementary portion of the respective pre-allocated block such that, after pre-allocating the new block of GPU memory, the entirety of available GPU memory of the client device remains allocated.

10 Claims, 20 Drawing Sheets

(56) References Cited

U.S. PATENT DOCUMENTS

| | | |
|---|---|---|
| 2009/0031289 A1 | 1/2009 | Michael |
| 2009/0313451 A1 | 12/2009 | Inoue et al. |
| 2015/0188992 A1 | 7/2015 | Ayanam et al. |
| 2017/0034297 A1 | 2/2017 | Waheed |
| 2020/0098082 A1 | 3/2020 | Gutierrez et al. |
| 2020/0134208 A1 | 4/2020 | Pappachan et al. |
| 2021/0011773 A1* | 1/2021 | Garg .................. G06F 9/45558 |

OTHER PUBLICATIONS

International Search Report in International Application No. PCT/US23/23193, mailed Aug. 22, 2023.

* cited by examiner

602

604

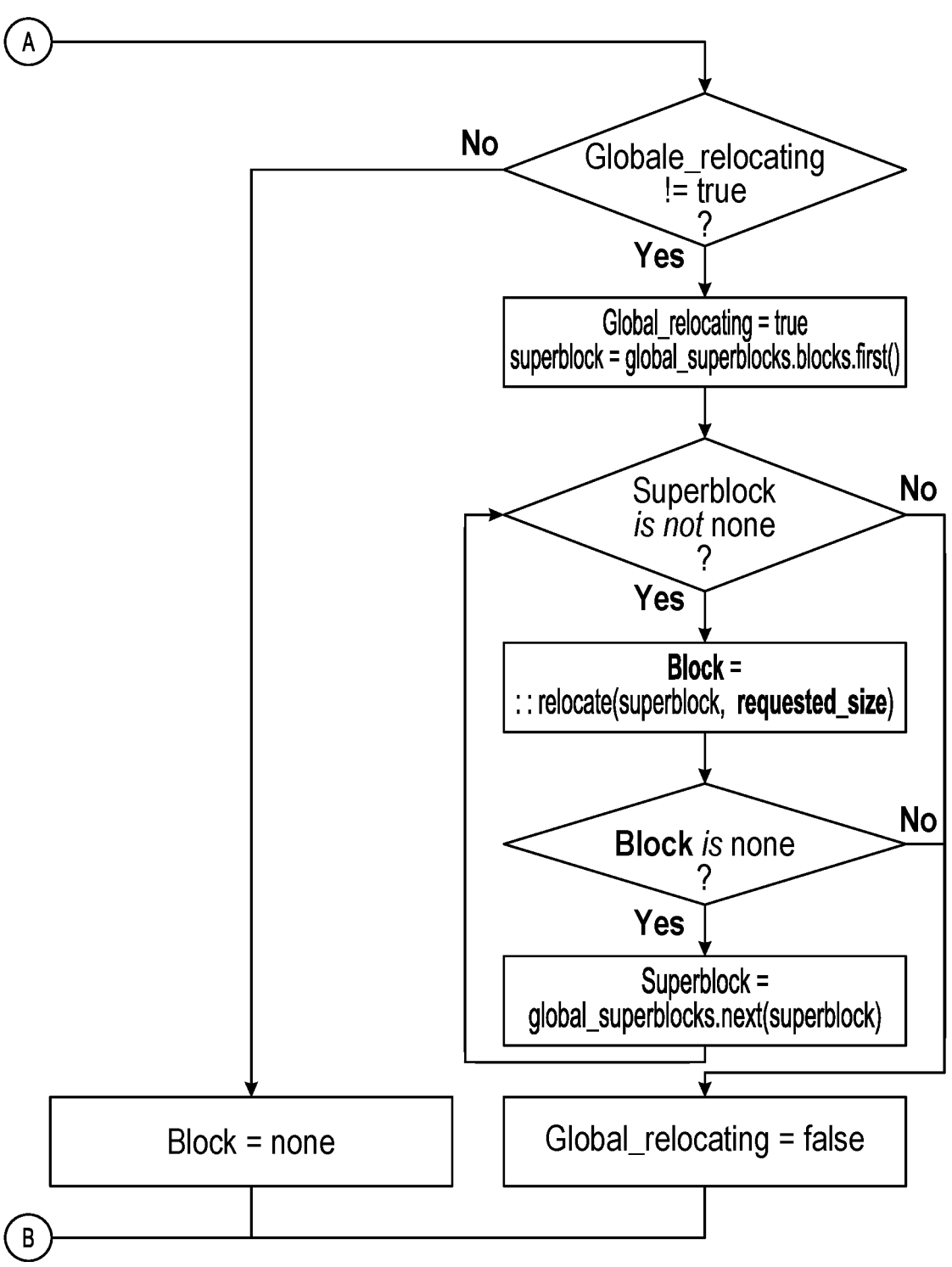
FIG. 6D (Continue)

700

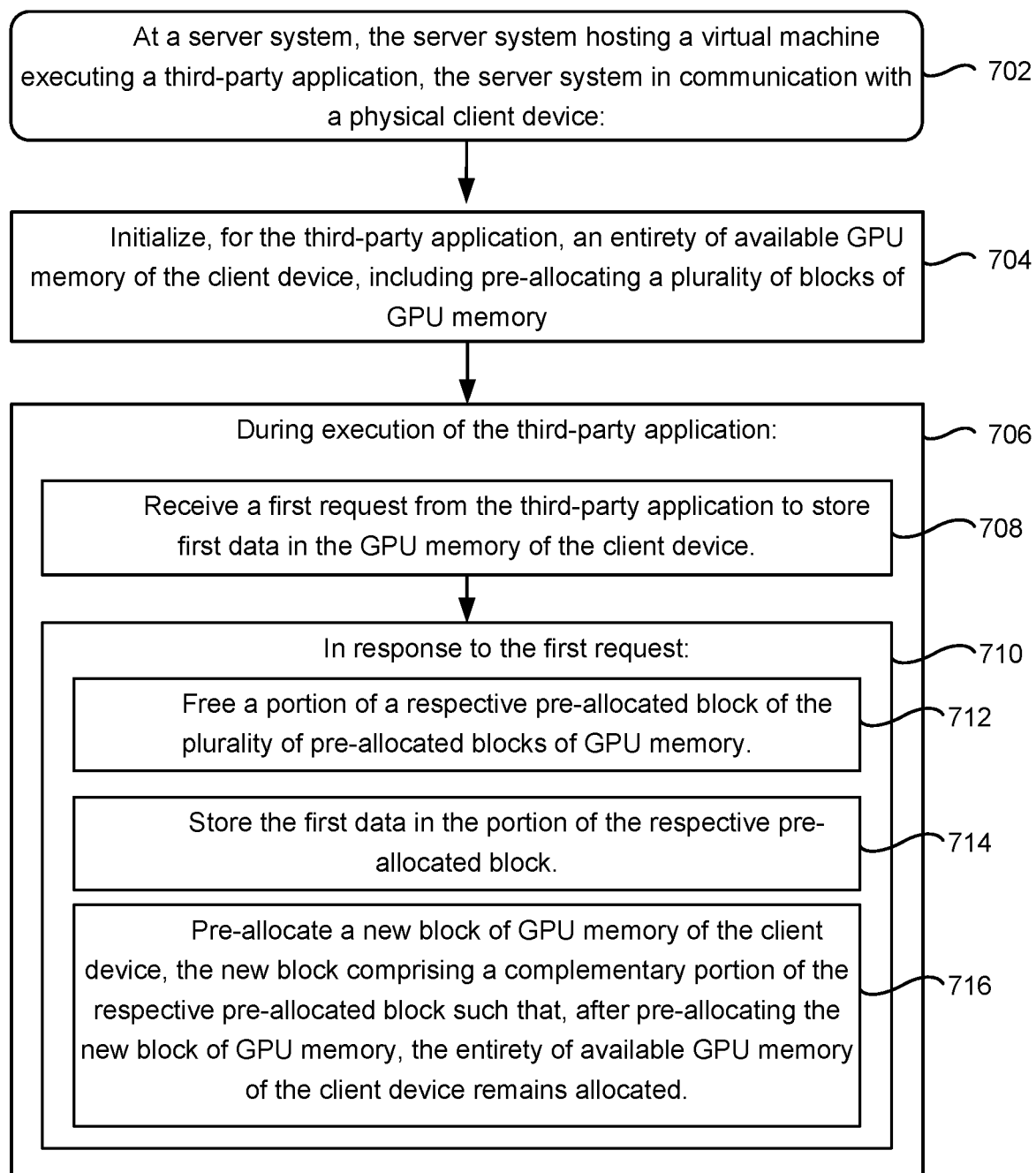

At a server system, the server system hosting a virtual machine executing a third-party application, the server system in communication with a physical client device: — 702

Initialize, for the third-party application, an entirety of available GPU memory of the client device, including pre-allocating a plurality of blocks of GPU memory — 704

During execution of the third-party application: — 706

Receive a first request from the third-party application to store first data in the GPU memory of the client device. — 708

In response to the first request: — 710

Free a portion of a respective pre-allocated block of the plurality of pre-allocated blocks of GPU memory. — 712

Store the first data in the portion of the respective pre-allocated block. — 714

Pre-allocate a new block of GPU memory of the client device, the new block comprising a complementary portion of the respective pre-allocated block such that, after pre-allocating the new block of GPU memory, the entirety of available GPU memory of the client device remains allocated. — 716

SYSTEMS AND METHODS OF ALLOCATING GPU MEMORY

CROSS-REFERENCES TO RELATED APPLICATIONS

The present application is a 371 National Stage Patent Application claiming priority to International Patent Application No. PCT/US23/23193 filed May 23, 2023, which claims the benefit of Provisional Patent Application No. 63/346,780, filed May 27, 2022, the contents of which are incorporated by reference herein.

FIELD OF ART

The present invention relates generally to memory management, and more particularly to tracking, at a server, allocation of memory blocks at a client device storing data.

BACKGROUND

Media content is often streamed directly to consumer devices by way of the Internet. Typically, the services that provide the media content can interact with a common web browser on a laptop, tablet, or smartphone or require a third-party application to run on a dedicated client device, such as a third-party Internet set-top box or smart TV. Some client devices, however, have limited processing power, graphical capabilities and memory. There is thus a need to reduce reliance on specialized client devices, for example, by offloading some of the processing to the cloud instead of locally on the client device. Doing so can be especially useful in increasing the lifespan of so-called "legacy" devices (e.g., older cable set-top boxes) and increasing the capability of "thin" client devices (e.g., client devices with severely limited processing power and memory).

Moreover, while client devices may perform a portion, or all, of the graphics processing required by applications, complexities arise from remotely executing applications in the cloud with respect to accessing media assets that are stored locally in the memory of the client device, so that the remotely-executed application can easily access already downloaded and stored media assets. Typical applications that run on a client device track where assets are temporarily stored, but virtually executing these applications in the cloud limits the application's ability to manage and track where various assets are stored, and how to retrieve the assets on the application's cue. Further, many client devices lack a memory management system that provides a map of the physical memory locations where assets are stored. As such, it is desirable to provide a system and method for managing the memory of client devices so that virtualized applications can still leverage the client device's local memory, for example, to store assets that may need to be accessed again.

SUMMARY

Some embodiments of the present disclosure provide a system for managing, by a remote server hosting a virtualized media-providing application, the memory of a client device, and more specifically, managing the graphical processing unit (GPU) memory of a client device that does not have a built-in memory management system. In some embodiments, the remote server pre-allocates the entirety of available GPU memory of the client device. The remote server can then manage the GPU memory of the client device by sending instructions to de-allocate and re-allocate memory. Using knowledge of a management scheme of the GPU memory, and by always keeping the GPU memory pre-allocated, the remote server can determine which pre-allocated blocks are de-allocated, and how the memory is re-allocated, allowing the remote server to essentially operate as a remote memory management system.

To that end, in accordance with some embodiments, a method is performed at a server system device hosting a virtual machine executing a third-party application. The method includes initializing, for the third-party application, an entirety of available GPU memory of the client device, including pre-allocating a plurality of blocks of GPU memory. The method includes, during execution of the third-party application, receiving a first request from the third-party application to store first data in the GPU memory of the client device. The method further includes, in response to the first request, freeing a portion of a respective pre-allocated block of the plurality of pre-allocated blocks of GPU memory, storing the first data in the portion of the respective pre-allocated block, and pre-allocating a new block of GPU memory of the client device, the new block comprising a complementary portion of the respective pre-allocated block such that, after pre-allocating the new block of GPU memory, the entirety of available GPU memory of the client device remains allocated.

In some embodiments, a computer readable storage medium storing one or more programs for execution by one or more processors of an electronic device is provided. The one or more programs include instructions for performing any of the methods described above.

In some embodiments, an electronic device (e.g., a server system) is provided. The server system comprises one or more processors and memory storing one or more programs for execution by the one or more processors, the one or more programs including instructions for performing any of the methods described above.

BRIEF DESCRIPTION OF THE DRAWINGS

FIG. 7 is a flowchart for a method of a server system allocating the memory of a client device, and tracking the allocations, in accordance with some embodiments.

DETAILED DESCRIPTION

In accordance with some embodiments, computer systems provide an environment for third-party applications in which applications can run unmodified in a server environment in the third-party's domain (e.g., in a manner that is transparent to third-party applications that run on a client device).

Various embodiments described herein are directed to improvements of application server systems. In such systems, the user interacts with various interactive TV and VOD applications, and/or video-conferencing applications remotely: with the user's interactions sent to a server system and video images transmitted back to the user's device. In this way, the user perceives the application as though it were running locally on the user's device.

In some embodiments, the applications (e.g., including video-conferencing applications and media-providing applications) include user interface elements rendered via a graphics API (e.g., OpenGL) with full-screen video and/or partial screen video (e.g., managed via a video playback API such as OpenMAX and/or managed via video decoding and rendering Android APIs). The applications are meant to be ported, installed and run locally on the client device. Instead, in some embodiments, methods are provided for running the application as, or similar to, unmodified Virtual Client Virtual Machines (VCVM) (e.g., and/or as containers) running on application servers in a different domain than the client's or central facility's domain. By virtualizing the used APIs, such as OpenGL and OpenMAX, application functionality can be separated from the rendering functionality.

Various embodiments of a remote virtualization system and process that enables users of a plurality of various client devices to interact with video and graphic-rich interactive applications running in a remote server environment are provided. The resulting user experience is essentially equivalent to running these applications on the local client device, even when these devices require access to remote server resources such as various graphics rendering and other resources.

Figure 1:
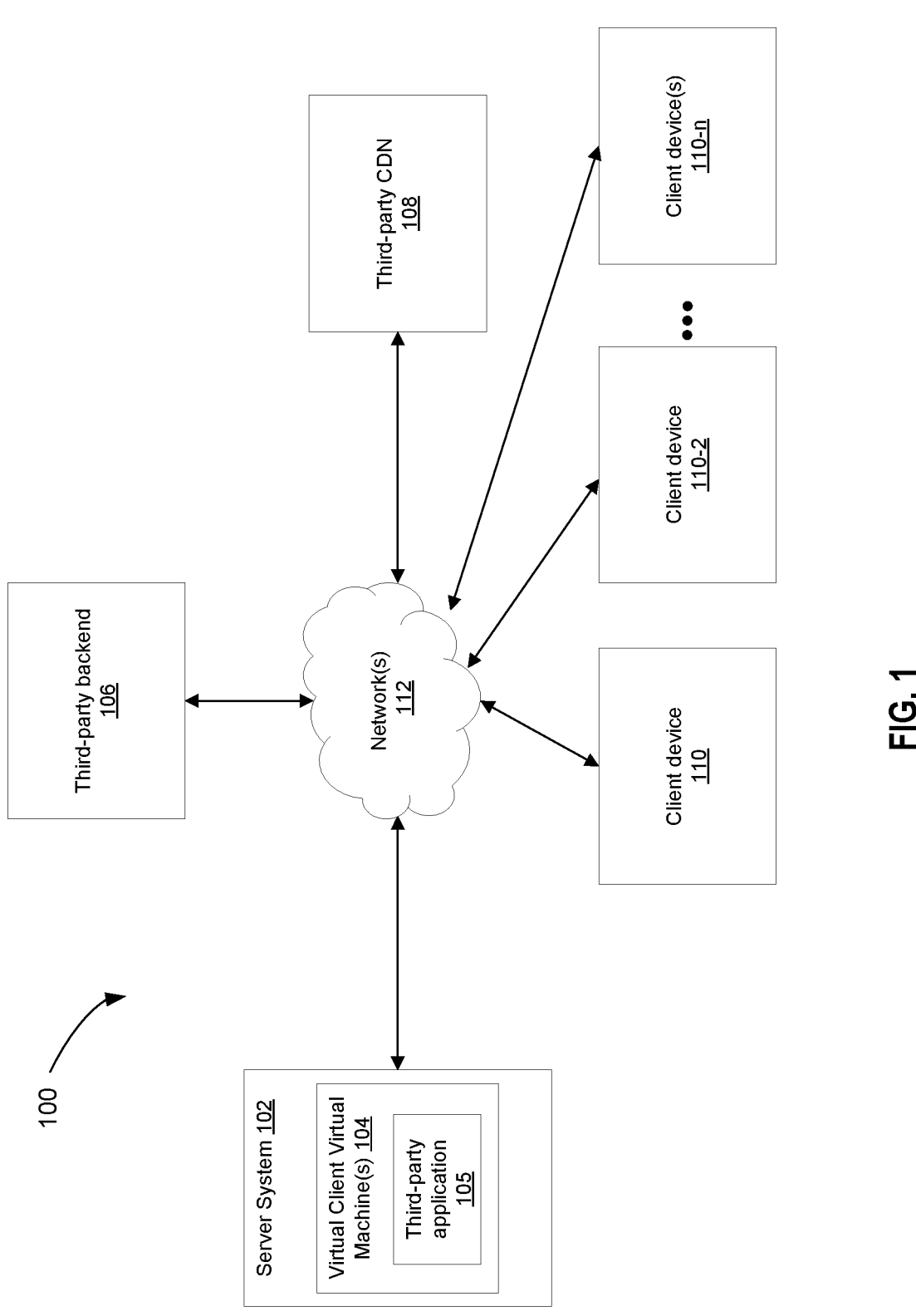
FIG. 1 is a top-level diagram illustrating a content delivery system, in accordance with some embodiments.

FIG. 1 is a top-level diagram illustrating a content delivery system, in accordance with some embodiments. System 100 includes server system 102 that is hosting one or more virtual client virtual machines (VCVM(s)) 104. Each VCVM executes one or more third-party application(s) 105. System 100 further includes third-party backend 106, third-party content distribution network (CDN) 108, and client device 110. Server system 102, third-party backend 106, third-party CDN 108, and client device 110 communicate with each other via one or more network(s) 112.

In some embodiments, a respective VCVM 104 (e.g., a Linux container) is associated with one or more client devices 110 (e.g., client device 110, client device 1102, client device 110-n). In some embodiments, the third-party application 105 and the third-party CDN 108 are associated with the same media providing service. In some embodiments, the third-party application 105 is configured to control playback of content provided by the third-party CDN 108 (e.g., the third-party application 105 is a virtualized application that would normally be executed on the client device 110). For example, the client device 110 displays content provided by third-party CDN 108 while the third-party application 105 is executing on VCVM 104. In this way, client device 110 offloads execution of the third-party application to the server system 102, reducing the processing power and/or memory required by the client device 110. As such, instead of client device 110 controlling playback of media content that is retrieved from third-party CDN 108, server system 102 controls playback by issuing playback commands to client device 110.

In some embodiments, third-party backend 106 stores third-party backend data. In some embodiments, third-party backend 106 is in communication (e.g., via network(s) 112) with the third-party application 105 that is executing on virtual client virtual machine (VCVM) 104. In some embodiments, a plurality of third-party applications 105 (e.g., each third-party application associated with a content provider) execute on a same VCVM (e.g., a user is provided access to a plurality of third-applications that are executed on VCVM 104).

In some embodiments, third-party backend 106 receives requests (e.g., from third-party application 105 executing on VCVM 104) and issues responses in accordance with third-party backend data. For example, the user selects a title from the user interface to watch, and in response to the selection, the third-party application 105 queries either the backend 106 or the CDN 108 to find out how to get the actual media content. In response to the query, third-party backend 106 performs a lookup to determine where (e.g., a directory or server) the first media content item is stored, and third-party backend 106 issues a response to the third-party application 105 that identifies where to retrieve the first media content item from the identified location of storage (e.g., at third-party CDN 108). Using this information, the third-party application 105 uses the network API to download the media content. In some embodiments third-party backend 106 receives other types of queries (e.g., queries that do not require obtaining media assets, such as to initiate or end a user session). For example, third-party backend 106 issues responses to third-party application 105 upon receiving requests for user authentication, user profile information, recently viewed content, and/or identification of content (e.g., content catalogues) that are available to the user.

In some embodiments, third-party CDN 108 (and/or third-party backend 106) stores third-party content, including media content such as video assets and/or image assets. A media asset may contain a single representation for either audio or video, or combinations of various representations of audio and video. In some embodiments, a media asset includes a single representation of audio and a single representation of video in separate assets so the third-party application can select and request a respective asset that is applicable for the current conditions (e.g., bitrate) and/or based on user preference (e.g., audio in a certain language). Each media asset (e.g., audio and/or video asset) may be subdivided in multiple segments (e.g., referred to herein as media stream segments) that can be individually and progressively downloaded from the CDN 108. In some embodiments, as explained above, the third-party backend 106 issues a response to the third-party application 105 (e.g., or a third-party application proxy at the server system), and the third-party application 105 forwards instructions (e.g., the command) to client 110 (e.g., to retrieve the first media content item (e.g., media assets for the first media content item) from third-party CDN 108) and/or executes the command at the third-party application 105. In order for server system 102 to accurately control playback of media content at client device 110, server system 102 needs information about how much of the media asset the client device 110 has retrieved (e.g., which media stream segments the client device has retrieved) from CDN 108 (e.g., and/or current playback information regarding what the client device is currently playing back). In addition, one goal in virtualizing third-party application 105 is to avoid the need to modify third-party application 105 as compared to a version of the application that would run on client device 110. Often, applications that control presentation of video and other media content are configured to have access to the video or other media content. But, having been virtualized, it would be extremely inefficient to send the video or other media content to both the server system 102 and the client device 110 (where it is ultimately displayed).

Accordingly, in some embodiments, upon receiving a media stream segment (e.g., corresponding to a portion of the media asset from third-party CDN 108 or a media asset from third-party backend 106), client device 110 generates a digest of the media stream segment (e.g., a file that includes information, such as metadata, from the media stream segment, but from which video/image content from the media stream segment has been removed or discarded, as described with reference to FIG. 2) and sends the digest to server system 102. The digest includes identifying information (e.g., header information, number of frames, etc.) about the media stream segment the client device 110 retrieved from CDN 108. Thus, server system 102 (e.g., and VCVM 104) receives the identifying information in the digest, processes the identifying information to generate a reconstructed media stream (e.g., by adding dummy video data), and provides the reconstructed media stream to third-party application 105 executing on VCVM 104. Third-party application recognizes the reconstructed media stream (e.g., is "tricked" into processing the reconstructed media stream as if it were the original media stream retrieved from CDN 108 or backend 106), and issues a playback command to initiate playback of the media stream segment (e.g., after the application confirms that the full media stream segment has been retrieved). The command to initiate playback is transmitted from third-party application 105 to client device 110.

In response to receiving the command to initiate playback, client device 110 displays the unmodified media stream segment that was retrieved (e.g., downloaded) from CDN 108 or backend 106. Thus, client device 110 displays original content from CDN 108 or backend 106 based on a playback command controlled by the third-party application 105 executing on the server system 102. In some embodiments, third-party application 105 that is executing on the server system does not receive the original (e.g., unmodified) content from the CDN. Instead, third-party application 105 processes a segment reconstructed from the digest (e.g., a media stream segment without the video data) and issues the playback command based on the reconstructed digest. This reduces the amount of bandwidth sent between the server system and client device by allowing the client device 110 to directly download the media content from CDN 108 or backend 106, store the media content at the client, and send a digest (e.g., that has a smaller data size than the original media content) to the server system 102 such that the third-party application 105 executes without awareness that the VCVM 104 is separate from client device 110. Because client device 110 does not have to download or execute third-party application, client device 110 may be a "thin-client" that has limited processing power and/or memory.

In some embodiments, the third-party application 105 is a video-conferencing application that supports multi-directional video calling (e.g., between a plurality of client devices). In some embodiments, an incoming media stream for display at client device 110 comprises a continuous video stream (e.g., received via third-party backend 106) from a second client device 110-2. For example, instead of the media asset being stored as a plurality of segments in a CDN, the media asset comprises a continuous stream, and a digest is generated for the continuous stream (e.g., instead of a digest segment being generated in accordance with a full segment being received at the client device). Accordingly, as referred to herein, the "original segment" comprises a media stream of a video-conferencing application that generated a digest segment in real-time and transmits the digest to the server system in real-time. Additionally, in some embodiments, client device 110 does not wait for a playback command from the server system 102 before decoding and displaying the incoming media stream. In some embodiments, the client device 110 includes a microphone and/or camera (e.g., and the server system 102 includes a virtualized microphone and/or a virtualized camera).

In some embodiments, the client device 110 (e.g., the first client device) retrieves content from a third-party backend 106, including video and/or image assets. In some embodiments, the content retrieved from the third-party backend 106 is stored locally at the client device (e.g., in a cache, in GPU memory, etc.). In some embodiments, the client device locally stores other graphics data (e.g., instructions for compositing graphical overlays).

Figure 2:
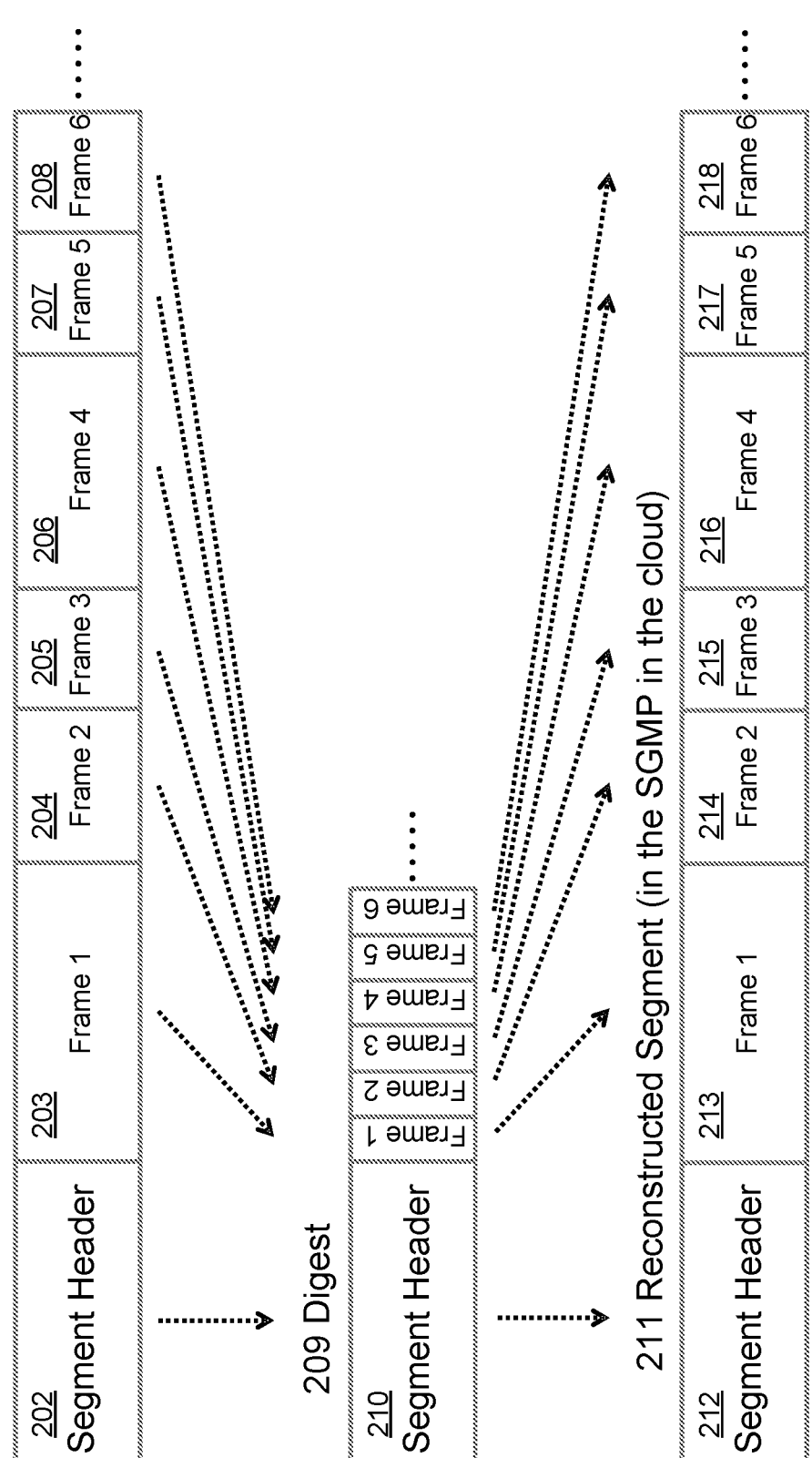
FIG. 2 is a diagram that illustrates the transformation of a video segment into a digest segment and its reconstruction into a reconstructed segment, in accordance with some embodiments.

FIG. 2 illustrates an example of generation of a digest 209 and a reconstructed segment 211. In some embodiments, a video stream comprises a plurality of media stream segments. The media stream segments are stored at CDN 108. In some embodiments, original segment 201 is obtained by client device 110. For example, client device 110 retrieves original segment 201 from the third-party CDN 108 (e.g., in response to the client receiving a command to retrieve the original segment 201).

Original Segment 201 depicts a hypothetical segment, such as an ISO base-media file-format (BMFF) segment as used in MPEG-dynamic-adaptive-streaming over HTTP (MPEG-DASH). Such a segment comprises a segment header 202 (e.g., which also corresponds to segment headers 210 and 212) and several frames, in this example, 203 to 208. It should be appreciated that the bulk of the segment data typically is the DRM-protected frame data. In some embodiments, the digest segment of the segment 209 is formed by removing the DRM-protected frame data and only including in the digest segment 209 the unmodified segment header (e.g., segment header 210 corresponds to unmodified segment header 202) and/or frame headers (such as picture headers and slice headers), including any codec specific headers, such as sequence headers, that are required to make an accurate reconstruction of the sequence of frames into reconstructed segment 211.

In some embodiments, after client device 110 receives original segment 201 (e.g., from CDN 108, or via video input 531), the client device 110 stores the original segment (e.g., in a buffer of the client device 110). In some embodiments, the client device 110 generates digest segment 209 and sends the digest segment 209 to server system 102. The server system 102 reconstructs the digest segment 209 into reconstructed segment 211 and provides reconstructed segment 211 to third-party application 105. Upon receiving reconstructed segment 211, third-party application 105 processes the reconstructed segment 211 (e.g., as if third-party application 105 had received original segment 201) and generates a playback command (e.g., a playback command that references and/or identifies original segment 201). The server system 102 sends the playback command to client device 110. In response to receiving the playback command, client device 110 initiates playback of original segment 201. In some embodiments, this process is repeated for each media stream segment that the client retrieves from CDN 108.

In some embodiments, instead of the client device 110 generating digest segment 209, client device forwards original segment 201 to server system 102 (e.g., and/or third-party CDN 108 sends original segment 201 directly to server system 102), and the server system generates digest segment 209 (e.g., and stores the digest segment 209 in a cache at the server system). Then, in some embodiments, in response to a second client device requesting playback for the same media asset, the server system 102 retrieves the digest segment for the requested media segment, reconstructs the digest segment, and provides the reconstructed segment to the third-party application 105 (e.g., that corresponds to a user session of the second client device).

Figure 3:
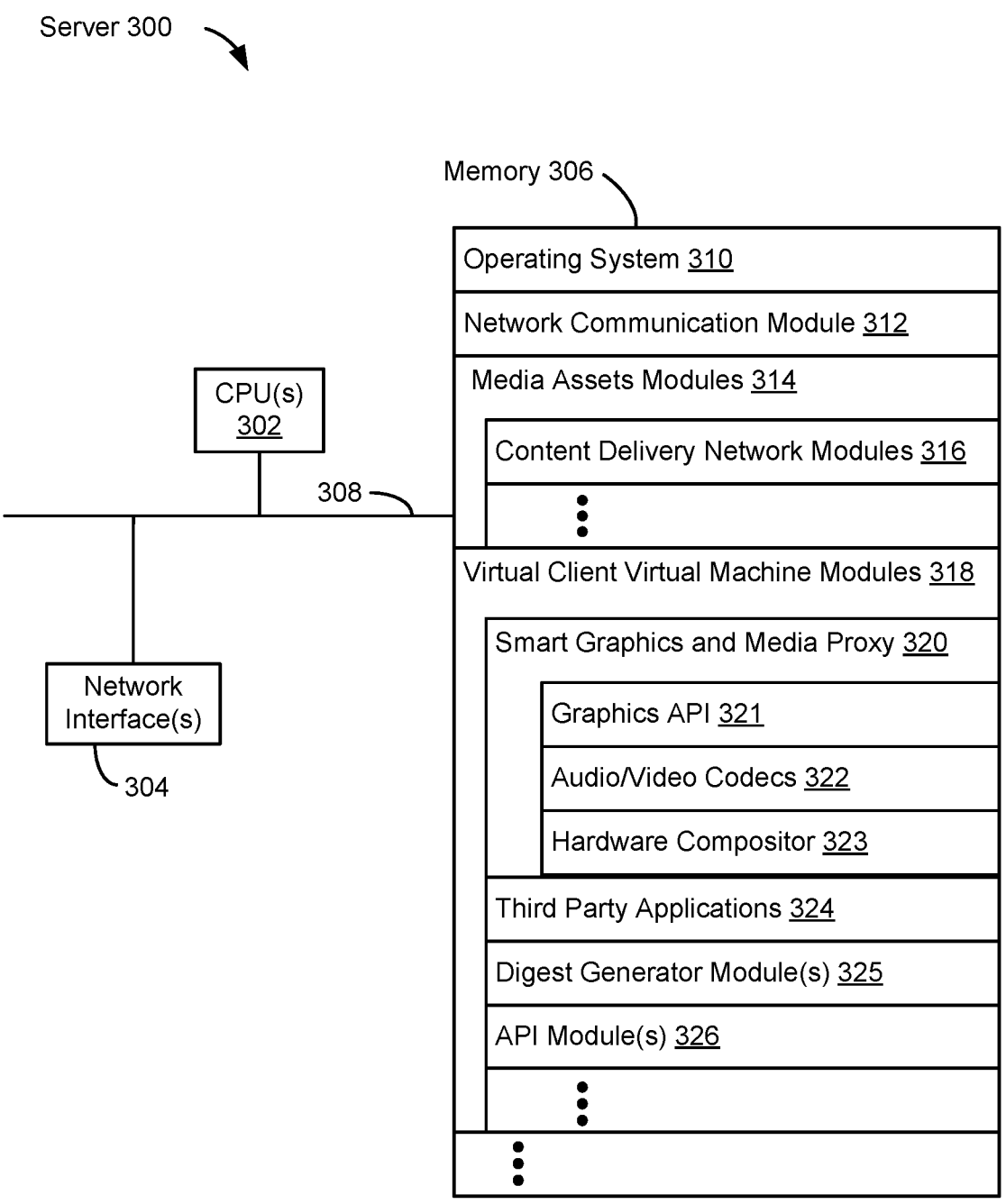
FIG. 3 is a block diagram of a server system, in accordance with some embodiments.

FIG. 3 is a block diagram illustrating an exemplary server computer system 300 in accordance with some implementations. In some embodiments, server computer system 300 is an application server system (e.g., server system 102) that executes virtual client virtual machine 104. The server computer system 300 typically includes one or more central processing units/cores (CPUs) 302, one or more network interfaces 304, memory 306, and one or more communication buses 308 for interconnecting these components.

Memory 306 includes high-speed random access memory, such as DRAM, SRAM, DDR RAM, or other random access solid-state memory devices; and may include non-volatile memory, such as one or more magnetic disk storage devices, optical disk storage devices, flash memory devices, or other non-volatile solid-state storage devices. Memory 306, optionally, includes one or more storage devices remotely located from one or more CPUs 302. Memory 306, or, alternatively, the non-volatile solid-state memory device(s) within memory 306, includes a non-transitory computer-readable storage medium. In some implementations, memory 306, or the non-transitory computer-readable storage medium of memory 306, stores the following programs, modules and data structures, or a subset or superset thereof:

- an operating system 310 that includes procedures for handling various basic system services and for performing hardware dependent tasks;
- a network communication module 312 that is used for connecting the server computer system 300 to other computing devices via one or more network interfaces 304 (wired or wireless) connected to one or more networks such as the Internet, other WANs, LANs, PANs, MANs, VPNs, peer-to-peer networks, content delivery networks, ad-hoc connections, and so on;
- one or more media assets modules 314 for enabling the server computer system 300 to perform various functions, the media assets modules 314 including, but not limited to:
  - content delivery network modules 316 for retrieving and/or processing media content received, for example, from CDN 108;
- one or more virtual client virtual machine modules 318 for executing one or more VCVM(s) 104; in some implementations, the one or more virtual client virtual machine modules 318 include:
  - smart graphics and media proxy 320 (also referred to herein as network proxy) for tracking graphical states of client devices and/or processing graphics content, including one or more of:
    - graphics API 321 for generating and/or sending GPU overlay instructions (e.g., openGL primitives) to a client device;
    - audio/video codecs 322 for determining and/or sending playback commands to a client device;
    - hardware compositor 323 (e.g., a virtualized hardware compositor) for generating and/or sending compositing instructions to a client device;
    - third-party applications 324 for execution on the VCVM(s) 104 (e.g., applications 324 include third-party applications as described above);

- digest generator module(s) 325 for generating digest segments (e.g., video and/or audio digest segments) based on media stream segments; and
- API module(s) 326 for calling and/or using APIs, including for example, a Network API and an API of the third-party application (e.g., media playback API) to process playback of the media streams and/or digest segments.

In some implementations, the server computer system 300 includes web or Hypertext Transfer Protocol (HTTP) servers, File Transfer Protocol (FTP) servers, as well as web pages and applications implemented using Common Gateway Interface (CGI) script, PHP Hyper-text Preprocessor (PHP), Active Server Pages (ASP), Hyper Text Markup Language (HTML), Extensible Markup Language (XML), Java, JavaScript, Asynchronous JavaScript and XML (AJAX), XHP, Javelin, Wireless Universal Resource File (WURFL), and the like.

Although FIG. 3 illustrates the server computer system 300 in accordance with some implementations, FIG. 3 is intended more as a functional description of the various features that may be present in one or more media content servers than as a structural schematic of the implementations described herein. In practice, items shown separately could be combined and some items could be separated. For example, some items shown separately in FIG. 3 could be implemented on single servers and single items could be implemented by one or more servers. The actual number of servers used to implement server computer system 300, and how features are allocated among them, will vary from one implementation to another and, optionally, depends in part on the amount of data traffic that the server system handles during peak usage periods as well as during average usage periods.

Figure 4:
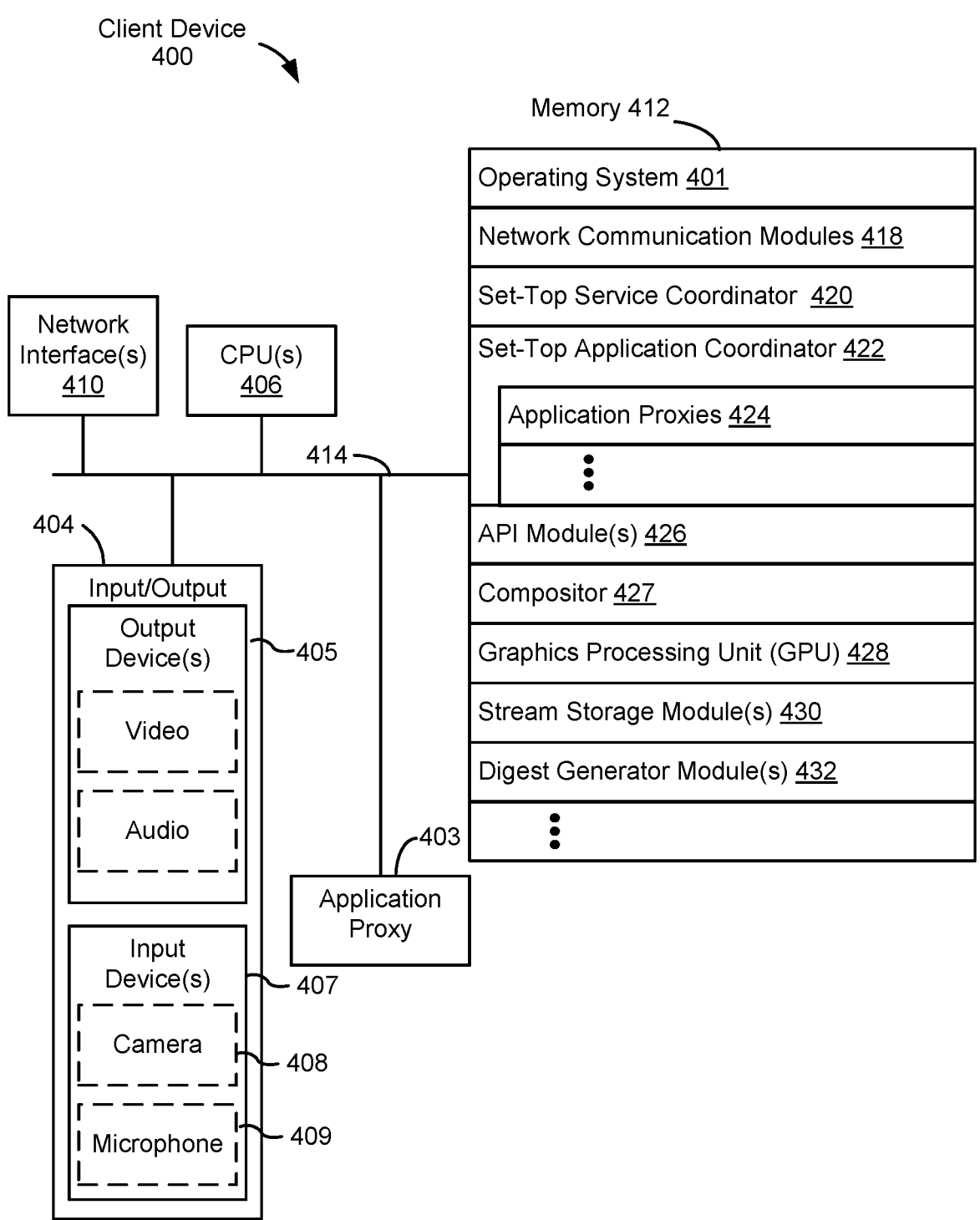
FIG. 4 is a block diagram of a client device, in accordance with some embodiments.

FIG. 4 is a block diagram illustrating an exemplary client device 400 (e.g., client device 110 of FIG. 1) in accordance with some implementations. The client device 400 typically includes one or more central processing units (CPU(s), e.g., processors or cores) 406, one or more network (or other communications) interfaces 410, memory 412, and one or more communication buses 414 for interconnecting these components. The communication buses 414 optionally include circuitry (sometimes called a chipset) that interconnects and controls communications between system components.

The client device includes input/output module 404, including output device(s) 405, such as video output and audio output, and input device(s) 407. In some implementations, the input devices 407 include a camera 408 (e.g., for video input) and/or microphone 409 (e.g., for audio input). In some implementations, the input devices 407 include a keyboard, a remote controller, or a track pad. For example, output device 405 is used for outputting video and/or audio content (e.g., to be reproduced by one or more displays and/or loudspeakers coupled with client device 400) and/or input device 407 is used for receiving user input (e.g., from a component of client device 400 (e.g., camera, microphone, keyboard, mouse, and/or touchscreen) and/or a control coupled to client device 400 (e.g., a remote control)). Alternatively, or in addition, the client device includes (e.g., is coupled to) a display device (e.g., to display video output).

The client device includes application proxy 403 for communicating with third-party applications that are executing on the server system. For example, taken together, server-side proxy (e.g., network proxy 320) and client-side proxy (e.g., application proxy 403) comprise an HTTP(S) proxy. For example, instead of storing and executing the application(s) on the client device, application proxy 403 receives commands (e.g., from a virtual machine in the server system) and, based on the received commands, instructs the client device to update the display accordingly. In some embodiments, application proxy 403 is not application-specific (e.g., application proxy 403 is generic for a plurality of applications).

In some implementations, the one or more network interfaces 410 include wireless and/or wired interfaces for receiving data from and/or transmitting data to other client devices 400, a server computer system 300, and/or other devices or systems. In some implementations, data communications are carried out using any of a variety of custom or standard wired protocols (e.g., USB, Firewire, Ethernet, etc.).

Memory 412 includes high-speed random-access memory, such as DRAM, SRAM, DDR RAM, or other random-access solid-state memory devices; and may include non-volatile memory, such as one or more magnetic disk storage devices, optical disk storage devices, flash memory devices, or other non-volatile solid-state storage devices. Memory 412 may optionally include one or more storage devices remotely located from the CPU(s) 406. Memory 412, or alternately, the non-volatile memory solid-state storage devices within memory 412, includes a non-transitory computer-readable storage medium. In some implementations, memory 412 or the non-transitory computer-readable storage medium of memory 412 stores the following programs, modules, and data structures, or a subset or superset thereof:

- an operating system 401 that includes procedures for handling various basic system services and for performing hardware dependent tasks;
- network communication module(s) 418 for connecting the client device 400 to other computing devices (e.g., client devices 110, server computer system 300, and/or other devices) via the one or more network interface(s) 410 (wired or wireless);
- a set-top service coordinator 420 for communicating with an operator data center, such as an orchestrator for handling content services provided to the client device (e.g., set-top box);
- a set-top application coordinator 422 for managing a plurality of third-party applications executing at the server system, the set-top application coordinator having additional module(s), including but not limited to: one or more application proxies 424 for communicating (e.g., graphical states) with third-party applications;
- API Module(s) 426 for managing a variety of APIs, including, for example, OpenGL and/or OpenMAX;
- Graphics Processing Unit (GPU) 428 for rendering graphical content, including frame buffering and display control, the GPU 428 is also associated with GPU memory for storing media assets;
- stream storage module(s) 430 (e.g., including one or more buffers) for storing original media content (e.g., from CDN 108), such as storing an original segment of a video stream; and
- digest generator module(s) 432 for generating respective digest segments for respective media stream segments (e.g., including video content and/or audio contented received by a camera and/or microphone) and sending the digest segments to the server system.

Features of the present invention can be implemented in, using, or with the assistance of a computer program product, such as a storage medium (media) or computer readable storage medium (media) having instructions stored thereon/ in which can be used to program a processing system to perform any of the features presented herein. The storage medium (e.g., the memory 306 and the memory 412) can include, but is not limited to, high-speed random access memory, such as DRAM, SRAM, DDR RAM or other random access solid state memory devices, and may include non-volatile memory, such as one or more magnetic disk storage devices, optical disk storage devices, flash memory devices, or other non-volatile solid state storage devices. In some embodiments, the memory 306 and the memory 412 include one or more storage devices remotely located from the CPU(s) 302 and 406. The memory 306 and the memory 412, or alternatively the non-volatile memory device(s) within these memories, comprises a non-transitory computer readable storage medium.

FIGS. 5A-5E illustrate block diagrams of allocating GPU memory of a client device. In some embodiments, the server system stores a map of the allocated memory, such that the server system is enabled to identify blocks that have been pre-allocated.

Figure 5A:
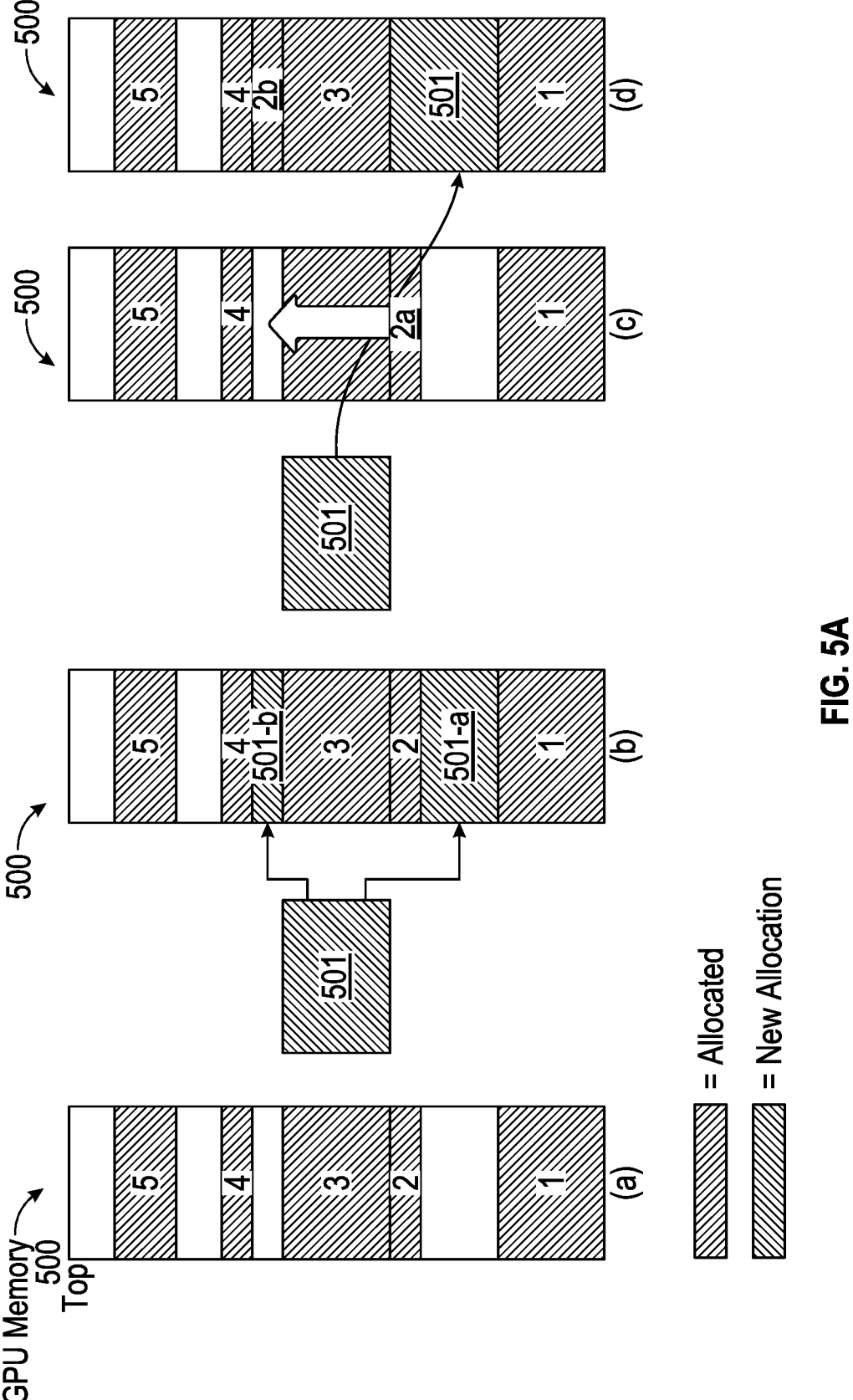
FIGS. 5A-5E are block diagrams of a client device's memory under control of a memory management system executing at a server, in accordance with some embodiments.

FIG. 5A is a block diagram illustrating the GPU memory of a client device. In some embodiments, the GPU memory blocks (a) and (b) illustrate an example of allocating memory blocks in a system that uses a memory management unit (MMU). In some embodiments, if a client device is MMU capable, the client device is enabled to store a block of data as two portions (e.g., because the MMU keeps track of the locations of storage at the client device and can separate out the data blocks). For example, if a memory management unit (MMU) is supported, a block of data 501 is enabled to be stored as two smaller blocks (e.g., divided into 501-*a* and 501-*b*) because the MMU is able to translate the virtual memory addresses (e.g., logical addresses) to physical addresses.

However, if an MMU is not supported, as represented by the GPU memory blocks (c) and (d) in FIG. 5A, and a block of data 501 needs to be stored while the GPU memory is in the state shown in (c) (e.g., the memory is fragmented), the device determines that there is no continuous available block in the memory that is large enough to fit the entire block of data 501, so the client needs to move data (e.g., stored in a smaller block) to another physical location of the memory in order create a continuous block of available memory to fit a new allocation for block of data 501. For example, the block of data 501 cannot be stored as two separate blocks (e.g., if there is no MMU on the client device) and instead, another portion of the memory (e.g., block 2*a*) is moved to free a continuous region large enough to store the block of data 501. For example, block 2*a* is moved to the portion shown as block 2*b*, which frees up a portion of the GPU memory such that block 501 can be stored.

Figure 5B:
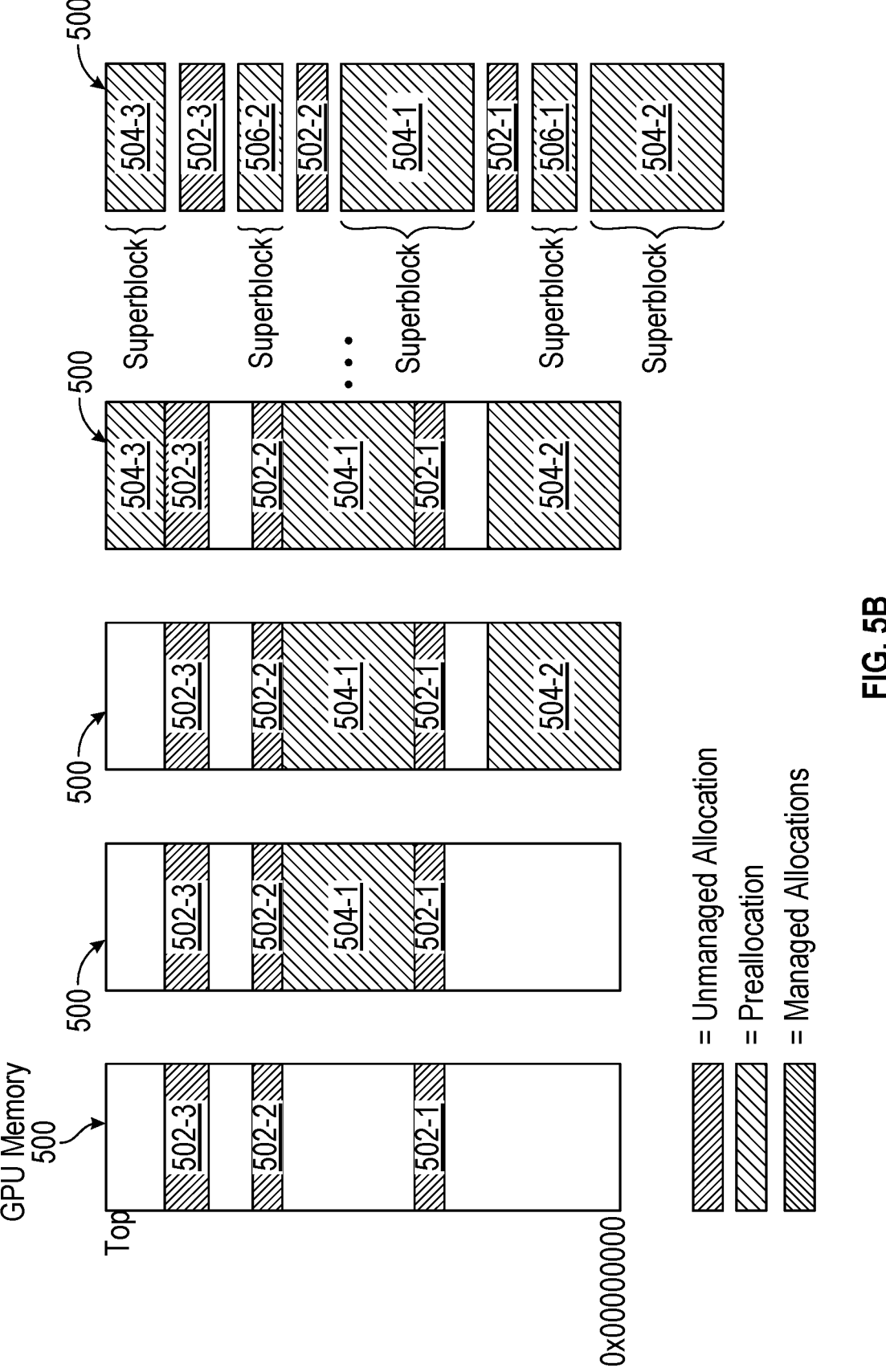

FIG. 5B illustrates a block diagram of GPU memory blocks of a client device. In some embodiments, the GPU memory is controlled by a server system (e.g., using the system architecture described with reference to FIG. 1). It will be understood that the memory management strategies described herein are applicable to in other systems with client devices that do not use an MMU (e.g., in systems other than the system architecture described with reference to FIG. 1). For example, while the embodiments described herein refer to GPU memory, the method of memory management is also used for other (e.g., non-GPU) memory.

In some embodiments, the GPU memory 500 of the client device includes a plurality of memory blocks for storing data for (e.g., on behalf of) a third-party application (e.g., to store media and/or instructions (e.g., OpenGL commands) for the third-party application). In some embodiments, the instructions are received by an API that uses opaque handles (e.g., handles that are used to point to data but have no relation to the physical GPU memory that is allocated) or an API that uses other descriptors as pointers to opaque structures in memory. For example, as explained with reference to FIG. 1, the client device retrieves media content from a CDN and locally stores the media content (e.g., to be displayed in response to the client receiving a request from the server system executing the third-party application). In some embodiments, after displaying stored media, the client device continues to store the media (e.g., in the GPU memory blocks) until the client device needs additional memory (e.g., has run out of space) and/or until the client device performs an eviction process (e.g., determines the media is no longer needed).

In some embodiments, the GPU memory 500 of the client device also stores data for the client device and/or other applications (e.g., or other servers). For example, the client device stores data for the third-party application (e.g., and/or for additional third-party applications executing on the server system), in addition to local client data (e.g., data that is loaded and stored on the client device, for example, by the device manufacturer). For example, a set-top box locally stores data for the set-top box provider (e.g., and is referred to as an "unmanaged allocation", with the crisscross hatch pattern in FIG. 5B). In some embodiments, the server system does not have access to the locally stored client data (e.g., the server system is unaware of the local data stored at the client device in allocated memory).

In some embodiments, the server system generates and stores a map of the GPU memory 500 of the client device. For example, the server system tracks blocks of memory at the client device. In some embodiments, the server system tracks an identifier and a size of blocks at the client device, but does not track a physical location of the blocks. For example, the server system does not have access to the internal storage of the client device, but is enabled to identify and store particular blocks after pre-allocating the blocks. This enables the server system to track where various media assets are stored (relative to the pre-allocated blocks), such that, in response to a third-party application requesting a respective asset (e.g., where the third-party application uses a handle to point to the asset), the server identifies a superblock in which the asset is stored (e.g., based on the handle received from the third-party application and the mapping stored at the server) and commands the client device to retrieve the asset within an identified superblock. In some embodiments, the client device is unable to derive relations between blocks of memory (e.g., physical addresses) because the handles are opaque handles. As such, the server is enabled to pre-allocate (and/or rearrange) blocks of memory at the client, while the opaque handles received from the API will still point to the correct block.

For example, because the server system does not have control over the physical locations of memory blocks in which the client stores data, the server system performs a method of pre-allocating (e.g., pre-filling) the memory blocks that are initially available in the GPU memory of the client device (e.g., at initialization of a session with the third-party application for the client device). After the server system has pre-allocated the available memory blocks in the GPU memory of the client device (e.g., to maximize the size of superblocks for the available memory), the server system stores a map of the superblocks (e.g., also referred to as pre-allocated blocks). As such, the server system can control release of a respective superblock (while the other allocated superblocks remain filled), such that when the client device retrieves and stores media data for the third-party application, the client device will store the media data within the released superblock (because no other blocks are available). This enables the server system to control where the client device stores data for the third-party application and enables the server to track the data. For example, initially, the server system does not know what is stored at the client device, or where the continuous blocks are in the memory (e.g., the size of the continuous blocks available in the memory). An example of the pre-allocation method is described with reference to FIG. 5B.

FIG. 5B illustrates a block of GPU memory 500-1 at the client device. In some embodiments, the server system is aware that the client has a certain amount of total GPU memory 500, but does not have knowledge of the physical addresses of blocks that the client has already used to store client data.

In some embodiments, blocks 502 (e.g., 502-1, 502-2, and 502-3) in the GPU are unmanaged blocks allocated by the client device (e.g., without control of the server system, also referred to as "unmanaged allocations"). For example, the unmanaged blocks include client data that is unknown to the server system (e.g., including the physical addresses of the blocks of memory storing the client data).

In some embodiments, the server system begins a method for pre-allocating superblocks in the (e.g., available) GPU memory (e.g., around the unmanaged blocks 502 that are occupied by client data). In some embodiments, the server system pre-allocates superblocks by finding blocks of available memory in the client device in which a largest superblock can fit (e.g., superblocks of a first size). For example, the server system initially tries to fit as many superblocks of the first size (e.g., a predetermined size) to locate the largest continuous blocks of memory available in the GPU memory. As shown in FIG. 5A, a first superblock 504-1 of the first size is identified and pre-allocated in GPU memory 500-2, and a second superblock 504-2 of the first size is identified and pre-allocated in the GPU memory. Thus, each of the identified superblocks 504 are identified as being continuous blocks of memory that fit the superblocks of the first size, and the server system pre-allocates the superblocks (e.g., fills the superblocks 504-1 and 504-2 with dummy data or otherwise makes the superblock unavailable for the client to store data in the continuous portion of the memory).

In some embodiments, after the server system has pre-allocated as many continuous blocks that will fit the superblocks 504 of the first size (e.g., pre-allocates blocks 504-1 and 504-2), the server system reduces the predetermined size of the superblock to a second size superblock 506 (e.g., that is smaller than the first size superblock 504). The server system recurses through the available GPU memory, and again, pre-allocates continuous portions of the GPU memory that can fit the superblocks of the second size (e.g., superblock 506). The server system repeats this process by decreasing the size of the superblocks until all of the memory of the GPU has been pre-allocated. As such, at the end of the pre-allocation process, none of the memory (of at least the minimum size superblock) is available within the GPU memory of the client device.

In some embodiments, the server system does not store physical locations of the superblocks that are pre-allocated in the memory. Instead, the server system stores a map that tracks the number and size of available superblocks, with an identifier for the superblocks (e.g., superblock 1, superblock 2, etc.). For example, after identifying and pre-allocating each superblock (e.g., superblocks 504, superblocks 506), the server system updates a map (e.g., having logical and/or physical addresses) of the pre-allocated superblocks, including storing size information for each superblock (e.g., the locations of the different sized superblocks that have been pre-allocated).

Figure 5C:
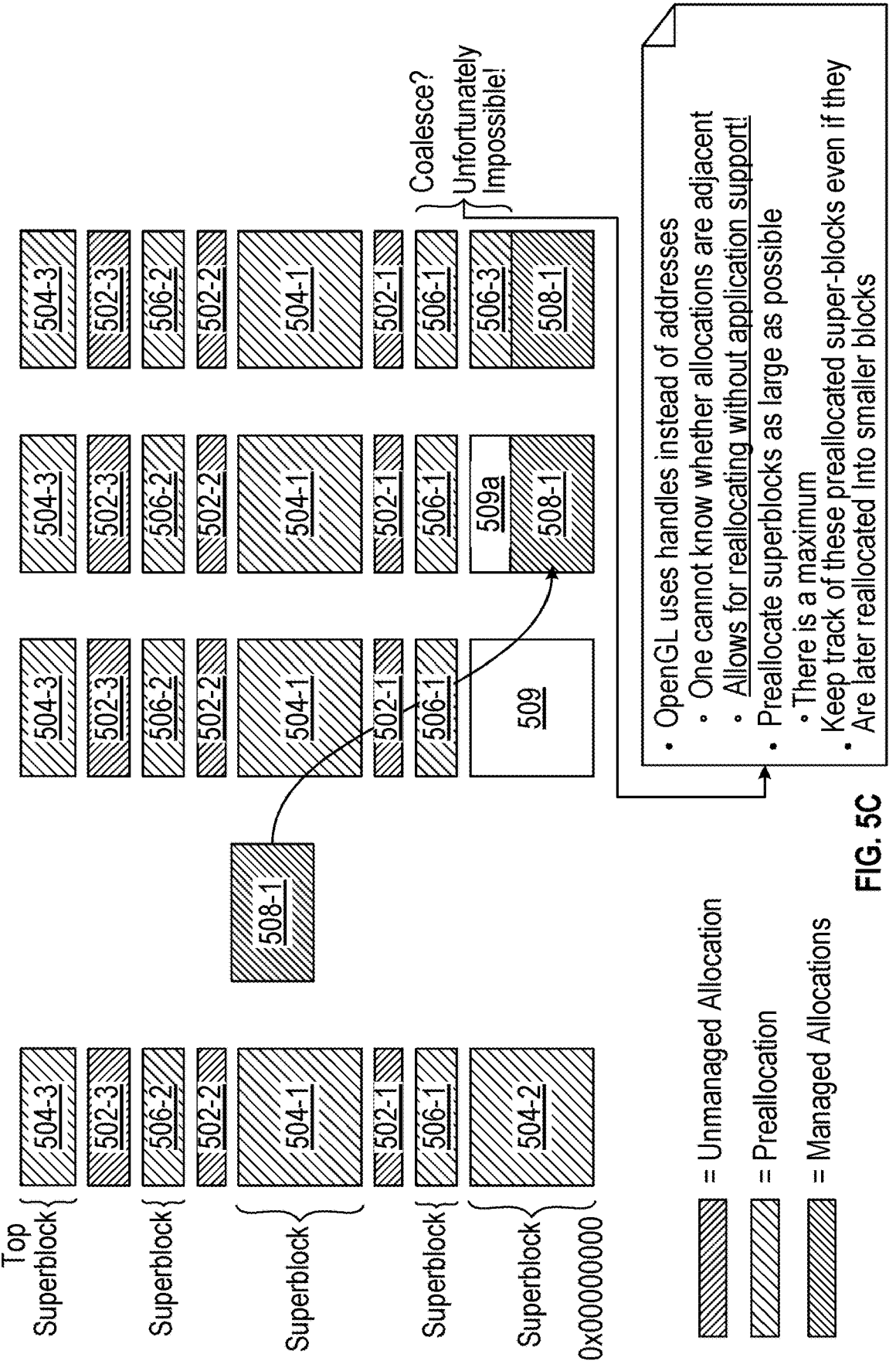

FIG. 5C illustrates the server system releasing a selected superblock 504-2, which was pre-allocated in FIG. 5B, such that data for the third-party application can be stored in the released superblocks. For example, the server system instructs the client to store a block of data 508-1. The server system determines the size of the block of data 508-1, and identifies one or more pre-allocated superblocks that has a size that can accommodate the block of data 508-1 (e.g., a superblock that has at least the size of block of data 508-1). In this example, the server system identifies superblock 504-2 and instructs the client to release superblock 504-2 (e.g., such that the client removes the pre-allocated data stored at block 504-2), which makes superblock 509 an available block of memory, without the client releasing any other superblock (e.g., all of the remaining memory remains allocated). After the client releases pre-allocated superblock 504-2 (e.g., to be freed as superblock 509), superblock 509 is the only available block of memory that can accommodate block of data 508-1 (e.g., because the remainder of the GPU memory is filled by pre-allocated or unmanaged blocks). The server system thus is aware that block of data 508-1 is now stored at the physical location that was mapped to pre-allocated superblock 504-2, and updates the mapping of the GPU memory to track where block 508-1 is stored in the memory (e.g., including a logical address of the block associated with the superblock). In some embodiments, in accordance with a determination that the size of the pre-allocated superblock 504-2 is larger than the size needed to store block of data 508-1, the server system also pre-allocates the remainder of the released superblock 509 (e.g., a complementary portion 509a of the released superblock that is free after storing block of data 508-1) with pre-allocated data as block 506-3. As such, block 506-3 is pre-allocated with data, and the entirety of the GPU memory at the client device remains full (e.g., with a combination of pre-allocated superblocks 504 and 506, blocks 502 of memory controlled by the client, and blocks 508 with data stored and controlled by the server (e.g., the third-party application)).

Note that block 506-1 and block 506-3, in this example, appear to be located next to one another physically. However, the server system is not aware of the physical location of blocks (e.g., only a logical mapping of continuous blocks are known), and thus, the server system is unable to coalesce block 506-1 and block 506-3 into a larger superblock, even though both of the block 506-1 and block 506-3 are pre-allocated by the server system.

Accordingly, the server system is enabled to reallocate blocks without support from the third-party application (e.g., which only has access to handles that reference data, but not information related to the physical memory storing the data). The server system keeps track of the pre-allocated super-blocks (e.g., using the map) even if the superblocks are later reallocated (e.g., into smaller blocks, and/or as the data gets moved between pre-allocated superblocks). As such, the device maintains a mapping of the superblocks, and their pre-allocated sizes (e.g., representing the maximum continuous block size for the respective pre-allocated superblock).

Figure 5D:
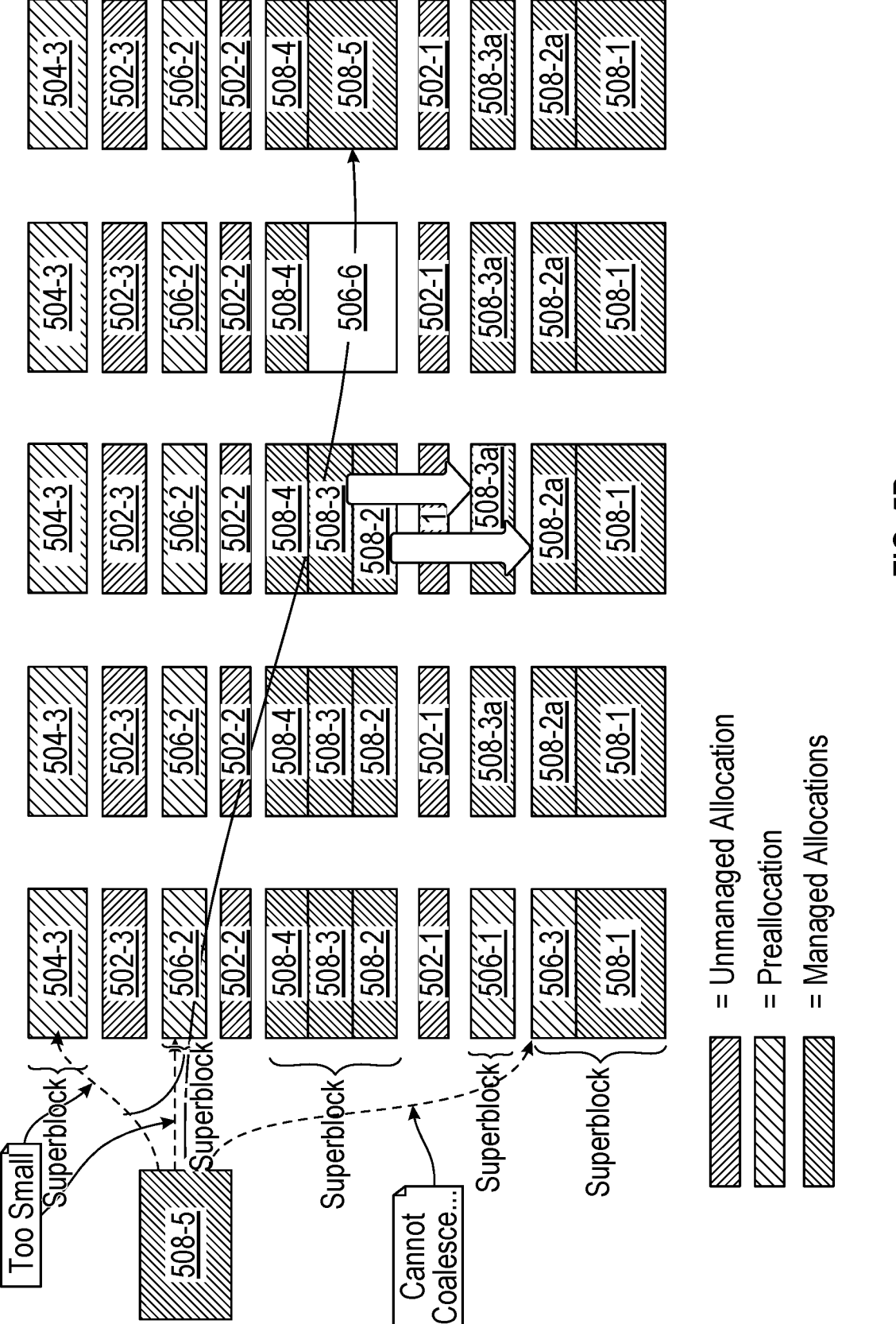

FIG. 5D illustrates the memory after additional data has been stored (e.g., using the method described above) as blocks 508-2, 508-3, and 508-4 (e.g., within superblock 504-1). In some embodiments, the server system rearranges the blocks that have been allocated with stored data in order to make a larger superblock available (e.g., available to store block of data 508-5). For example, block 508-2, block 508-3 and block 508-4 store data within a superblock that was initially pre-allocated (e.g., as superblock 504-1). The server thus is aware that the superblock having the size of super-block 504-1 is a continuous block of memory that is currently storing three distinct data blocks: block 508-2, block 508-3 and block 508-4. In some embodiments, the server system determines that the block 508-2 and block 508-3 can be moved (e.g., the data is released) so that a larger continuous superblock 506-6 is available to be pre-allocated (e.g., again). In some embodiments, to do this, the server system redesignates block 508-2 to another pre-allocated block 506-3 (e.g., by copying the stored data in block 508-2 into pre-allocated block 506-3, the managed allocation is shown as block 508-2a). The server system also redesignates block 508-3 to a pre-allocated block 506-1 (e.g., the data copied to block 506-1). After copying the data to blocks 508-2a and 508-3a, the data is released (e.g., erased from) blocks 508-2 and 508-3 to free the blocks. In some embodiments, blocks 508-2 and 508-3 are merged into a single, available block 506-6. Once superblock 506-6 is available (e.g., not storing any data), the server system is enabled to pre-allocate (e.g., fill with dummy data) available block 506-6 into a pre-allocated block, which can then be filled by the data in block 508-5. Note that in the example of FIG. 5D, only blocks 508-2 and 508-3 were released from the originally pre-allocated superblock corresponding to block 504-1 (e.g., because releasing two of the three blocks 508-2, 508-3 and 508-4 freed enough continuous memory to fit block of data 508-5). In some embodiments, block 508-4 could also be released to create an even larger continuous block than block 506-6. It should also be noted that the block 508-2 cannot be coalesced with, for example, block 502-1 because block 502-1 is an unmanaged block of memory (e.g., and thus the system is blind as to the physical location of the block of memory 502-1). For example, the system only recognizes that a continuous block 506-6 can be freed because the system originally pre-allocated that portion of the memory as superblock 504-1.

Figure 5E:
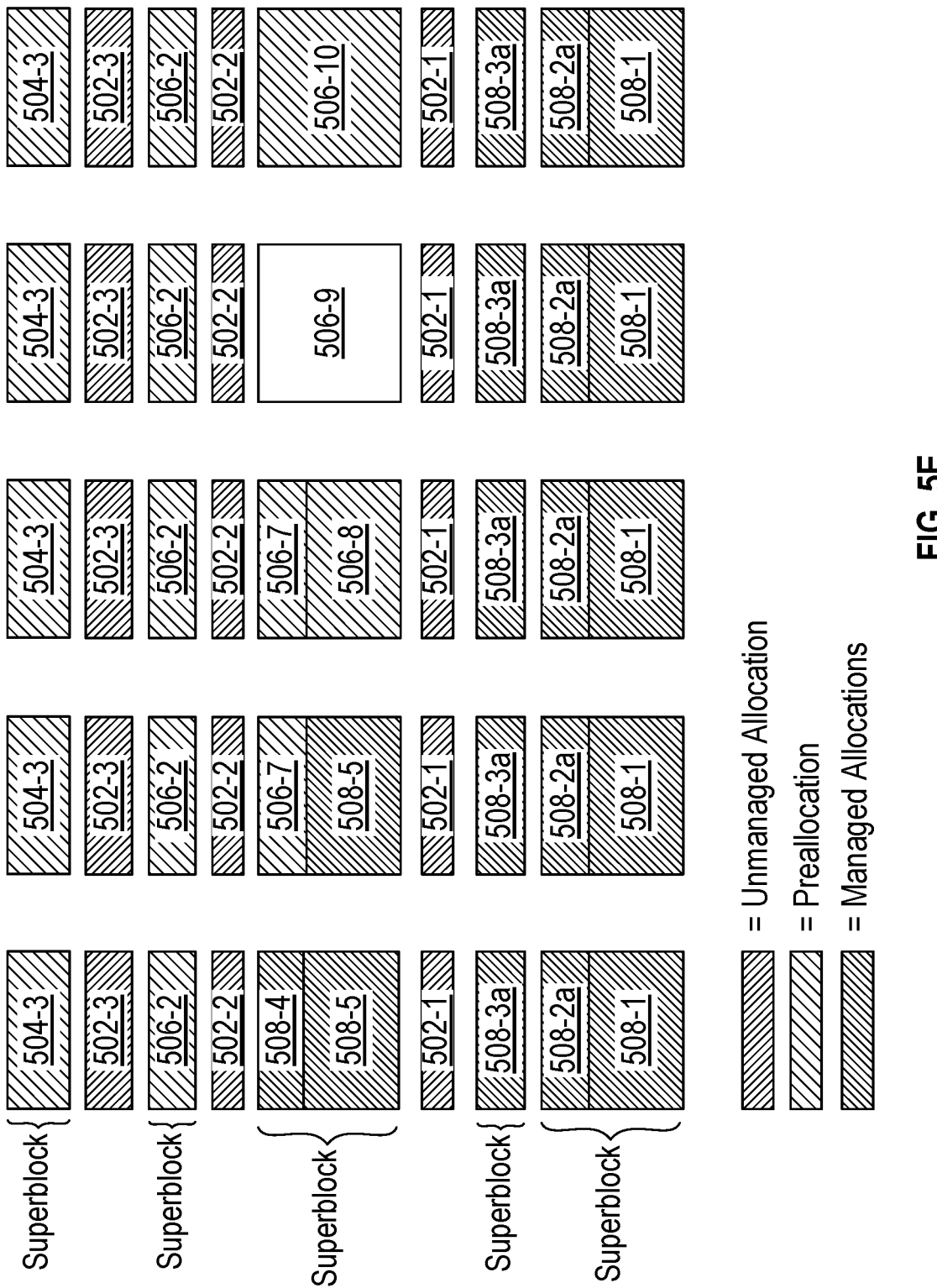

FIG. 5E illustrates moving allocated blocks of memory to make space for storing a block of a larger size. For example, the data stored in block 508-4 is freed such that the respective portion of memory is recognized as a pre-allocated block 506-7. Further, the data managed in block 508-5 is freed to be recognized as a pre-allocated block 506-8. At this point, the system recognizes that pre-allocated blocks 506-7 and 506-8 are available (e.g., not storing any data for the application), and that blocks 506-7 and 506-8 are physically located next to one another (e.g., because they are within the same superblock that was initially pre-allocated), and can thus be coalesced into a larger block by freeing both blocks 506-7 and 506-8, which leaves an empty, continuous portion of memory 506-9 (e.g., while the rest of the GPU memory remains completely full, with real data or pre-allocations) for the system to fill as a pre-allocated block 506-10. As such, block 506-10 is mapped in the server as an available, pre-allocated block (corresponding to superblock 504-1 in the initial pre-allocation), and the server can direct data to be stored within the block according to the mapping. The mapping is updated at the server system in accordance with the newly pre-allocated portions.

Figure 6A:
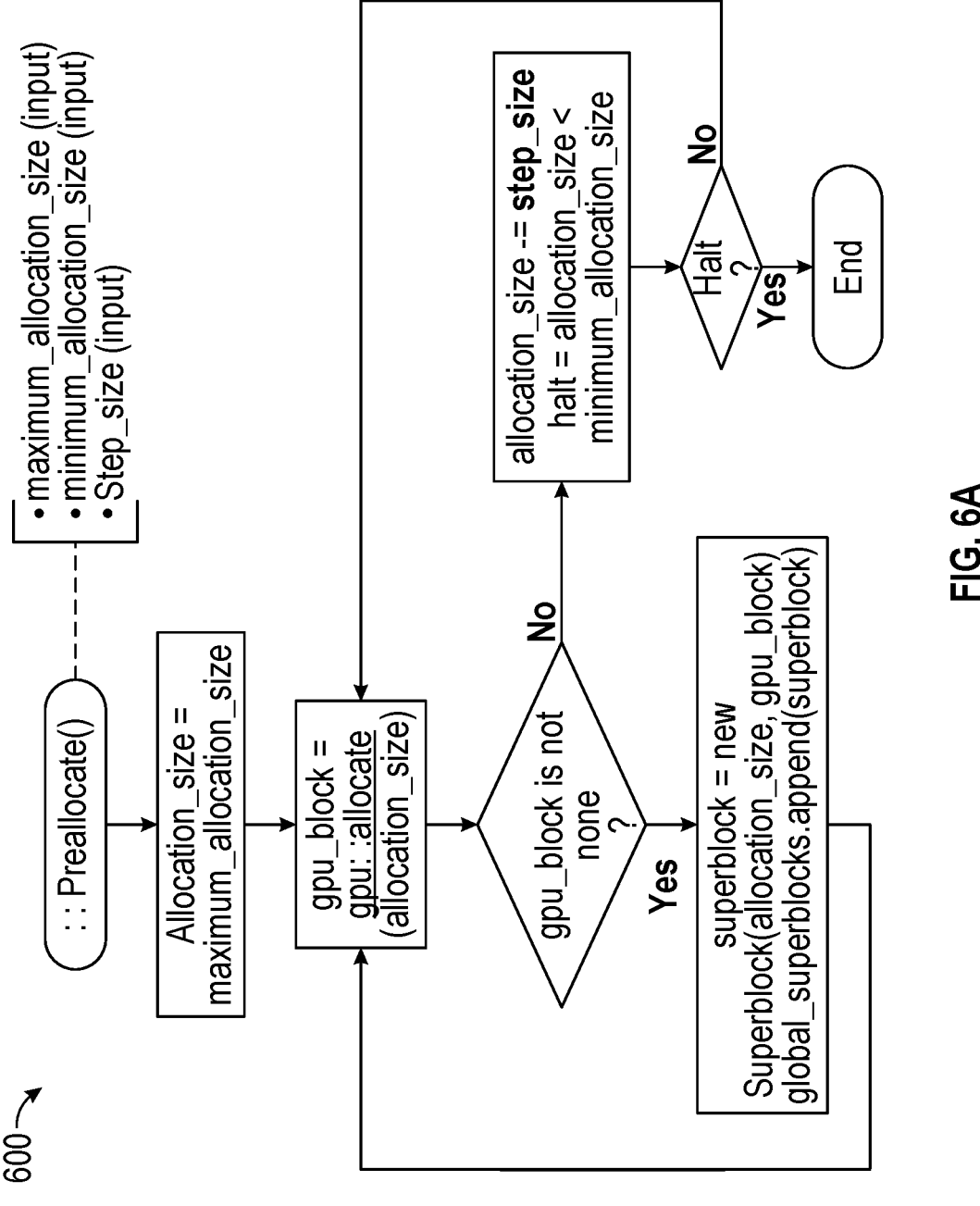
FIGS. 6A-6I are flow diagrams of processes for a server controlling memory allocations of a client device, in accordance with some embodiments.

FIGS. 6A-6I illustrate flowcharts of performing various methods for pre-allocating and reallocating portions of the GPU memory at the client device, as described above with reference to FIGS. 5A-5E. For example, FIG. 6A illustrates a flowchart for a method 600 of pre-allocating blocks of memory. In some embodiments, a maximum allocation size (e.g., a size of the largest continuous block of memory), a minimum allocation (e.g., a size of the smallest continuous block of memory to be pre-allocated) and a step size (e.g., a change in the size that the device looks for in available memory during the pre-allocation process) are inputs (e.g., predefined inputs) used to perform the method.

In some embodiments, the method 600 for pre-allocating memory is initialized such that an allocation size is initially set to the maximum allocation size (e.g., to find the largest continuous blocks of memory within the GPU memory). In some embodiments, the device iterates through the GPU memory and finds any GPU blocks of memory that have the allocation size, and in accordance with a determination that at least one block is identified as having the allocation size ("Yes"), the device defines the GPU block as a new super-block and stores the superblock in the mapping. The device then repeats this process (e.g., determining whether a block is identified as having the allocation size), until the process returns "None" (e.g., no GPU blocks are identified as having the allocation size) ("No"). The device then reduces the allocation size by the step size and, in accordance with a determination that the new allocation size is greater than the minimum allocation size (e.g., halt=No), the allocation size is reduced (e.g., from the maximum allocation size, to a smaller size of memory), and the device iterates through the GPU memory and finds any GPU blocks of memory that have the new allocation size. In some embodiments, the device repeats this process to find the largest continuous blocks in the GPU memory, until the allocation size is at or below the minimum allocation size (e.g., halt=yes), and the process for pre-allocation ends. For example, as described with reference to FIG. 5B, block 504-1 is pre-allocated, then a block 504-2 (e.g., of a smaller size than block 504-1) is pre-allocated, and the size of the pre-allocated blocks decreases as the system iterates the pre-allocation process until the entirety of GPU memory 500 is allocated (e.g., by a combination of pre-allocated blocks, unmanaged allocations, and/or managed allocations).

Figure 6B:
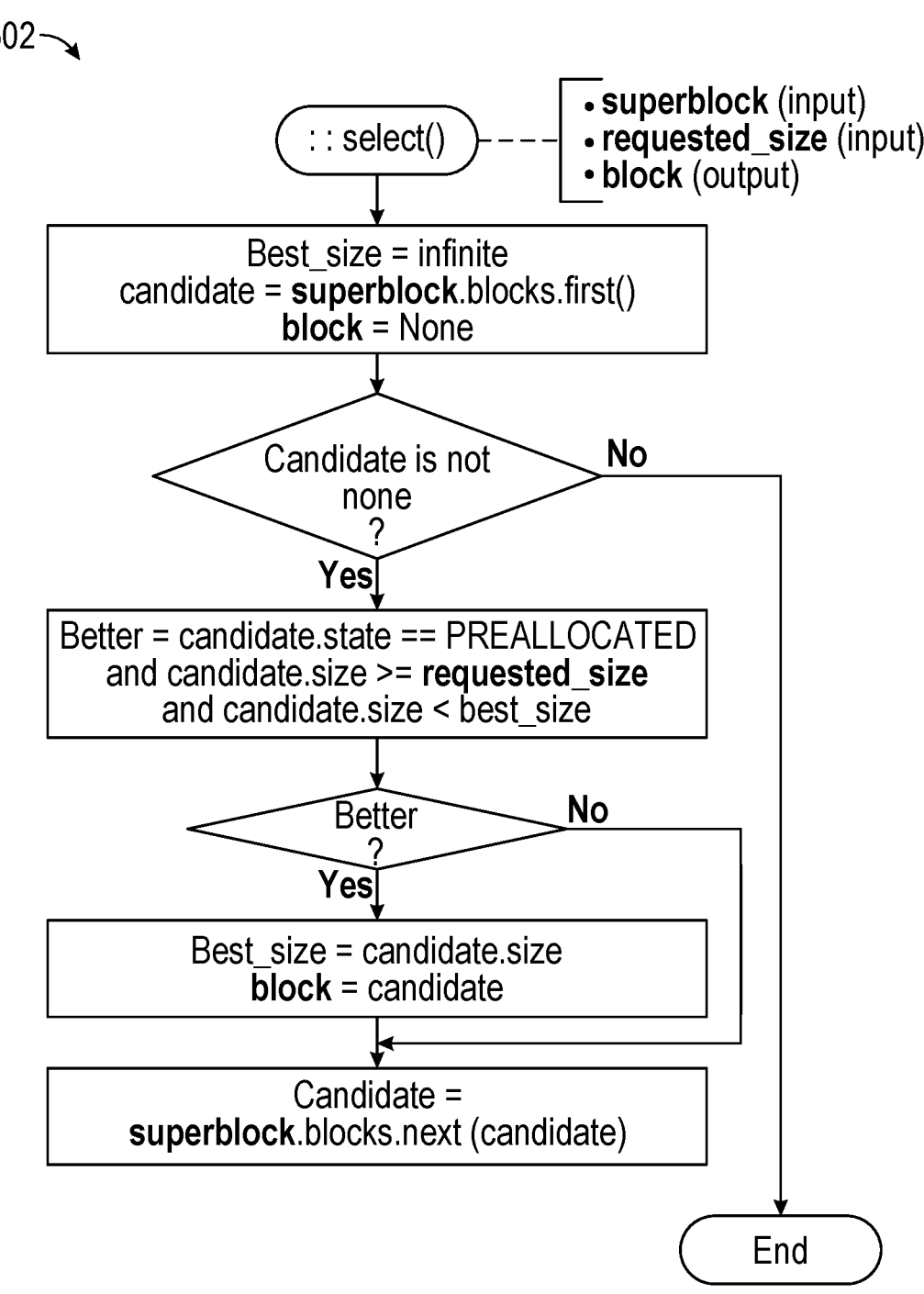

FIG. 6B illustrates a flow diagram for a method 602 of selecting, from within a pre-allocated superblock (e.g., determined using method 600), a best fitting pre-allocated block in which to store data (e.g., changing the block from a pre-allocated block to a block in the store state (e.g., also referred to as a managed allocation)). For example, the:: select( ) function illustrated in FIG. 6B represents the command to initiate the method 602. In some embodiments, the inputs to the function:: select( ) include the superblock and the requested size. The process begins by identifying the pre-allocated superblocks (e.g., as determined using the process 600 illustrated in FIG. 6A), and determining the requested size (e.g., a size of the data that needs to be stored in the GPU memory). In some embodiments, the process iterates through the blocks and determines whether a block exists that can fit the data. Initially, the best size is set to infinite. In accordance with a determination that at least one superblock can fit the data (e.g., "Yes" candidate is not None), the device determines whether the candidate size is greater than the requested size (e.g., the size needed to store the data) and whether the candidate size is less than the best size, and if "yes" (e.g., initially, any block will be less than the infinite size), the best size is updated to the size of the candidate size and the current block is selected as the current candidate.

A local variable best_fit is defined and the candidate variable is set to the first block in the superblock's block list. In some embodiments, the process 602 is iterated continuously until all blocks have been processed. Within the loop executed if "candidate is not None"=yes, each candidate block is evaluated to be better than the current respective block, that is, the respective block must be in the "PREAL-LOCATED" state, its size must be larger than the request-ed_size argument and must be smaller than the best_size found so far. If the respective block is better, then best_size and block are updated accordingly. Finally, the next block is retrieved and the loop starts from the top. The net result is finding the best fitting pre-allocated block for the requested size. This function is a utility function for the:: allocate( ) function as depicted in FIG. 6D.

As such, the device iterates through the process again, looking for another candidate, and updating the candidate to a different superblock only if that superblock has a candidate size that is greater than or equal to the requested size and less than the best size. In some embodiments, the device is identifying a closest match between a size of a preallocated block and a size needed to store the data. This improves the allocation of the memory by not selecting a large continuous block of memory for only a small amount of data (e.g., a small block of data) if the small amount of data can fit in another preallocated portion of the memory that has a smaller superblock size.

Figure 6C:
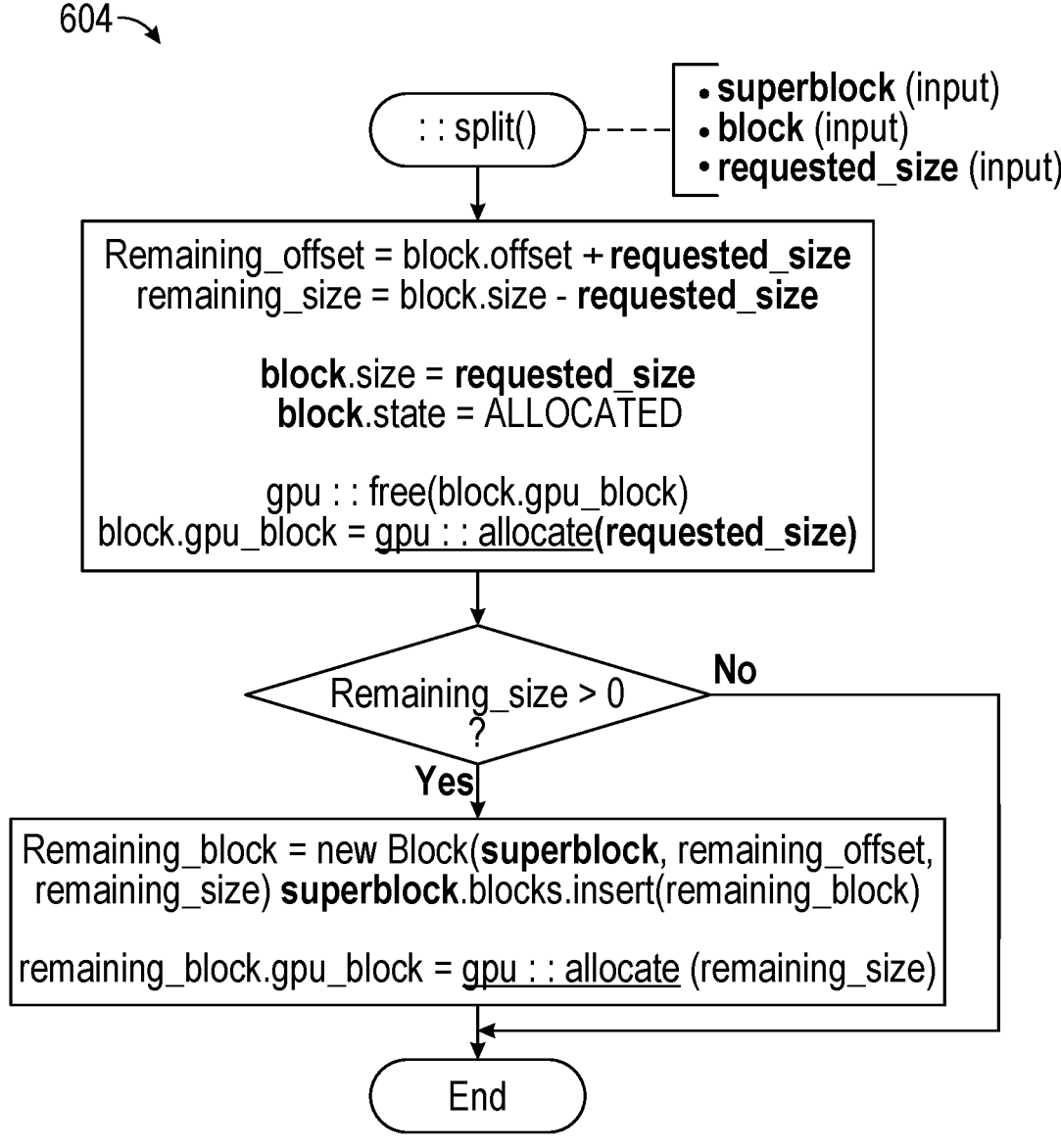
Figure 6D:
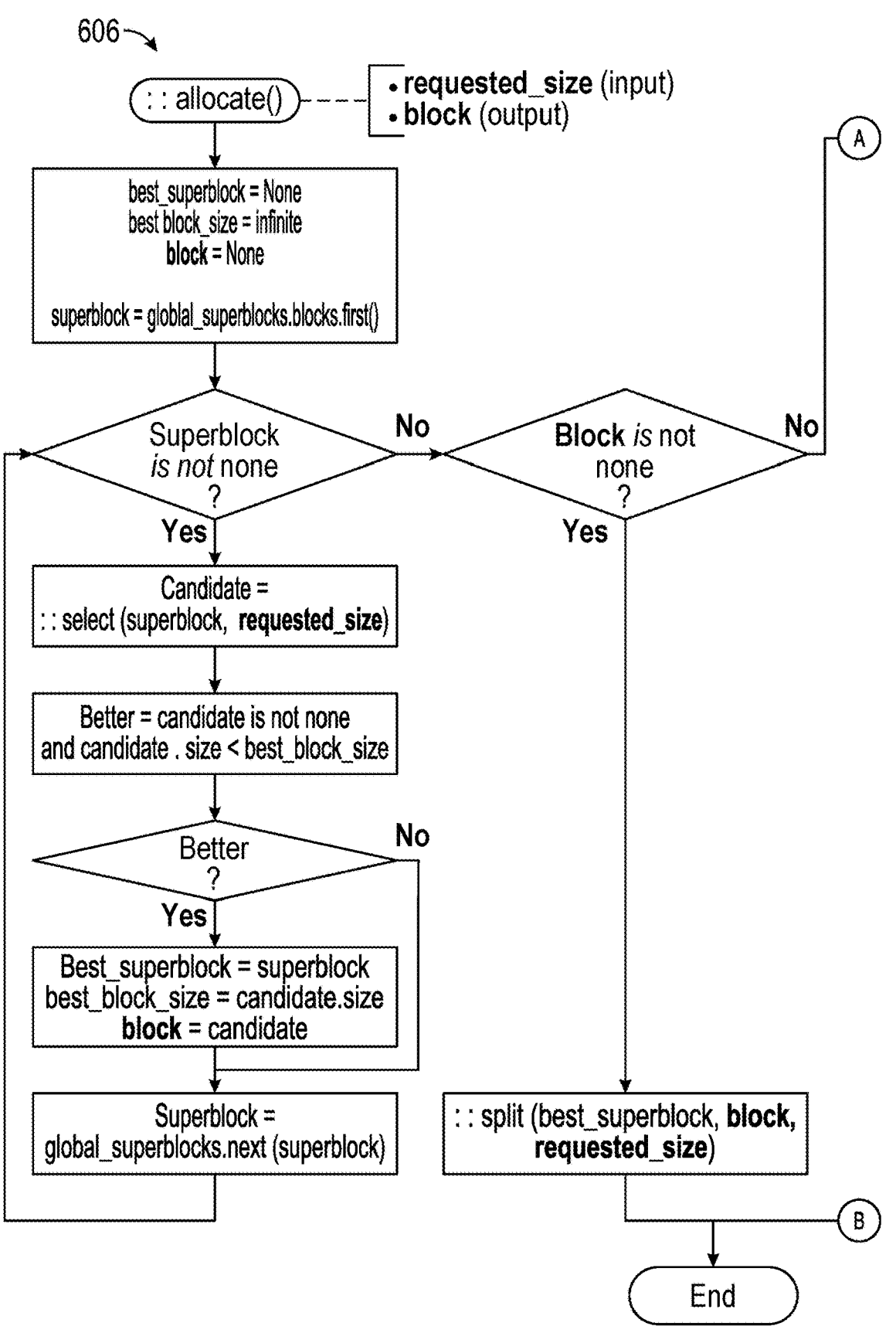

FIG. 6C illustrates a flow diagram for a process of splitting (e.g., using a:: split( ) function) a pre-allocated block in accordance with allocating a portion, less than all, of the pre-allocated block with data (e.g., such that the device can map the remaining portion of the superblock as still available, and maps the location of the remaining portion of the superblock as continuous with the newly stored data in the allocated portion). In some embodiments, the method 604 splits a pre-allocated block, passed as the function's argument 'block' into an ALLOCATED block of requested size and, optionally, a remaining PREALLO-CATED block. The function also calls the gpu::free( ) and gpu::allocate( ) functions to first free the pre-allocated GPU block and subsequently allocate a block of requested size and a block of remaining size.

For example, a superblock (e.g., the pre-allocated super-block stored in the mapping), a block (e.g., the requested block of data to be stored within the superblock), and a requested size (e.g., the size of the requested block of data that is to be stored) are inputs to the process. The device updates the mapping of the remaining portion of the pre-allocated superblock (e.g., that was not used to store the block of data). For example, the device determines an offset based on the address of the pre-allocated block, plus the requested size (e.g., of the block of data to be stored) to determine the new starting address of the remainder of the pre-allocated block. The device also determines the size of the remainder of the pre-allocated block by subtracting the size of the block of data to be stored from the size of the pre-allocated superblock. The device allocates the requested size (e.g., to store the data) and frees the superblock so that the device will store the data in the superblock. In some embodiments, if the block of data is the same size as the size of the pre-allocated superblock, the entirety of the pre-allocated superblock is updated to the block state of "Allo-cated" (e.g., and no portion of the superblock remains available (remaining size=0), which leads to "No"), and the process ends. If, however, the remaining size is greater than 0, the remainder of the block is defined and again pre-allocated. For example, as described with reference to FIG. 5C, a superblock 504-2 (e.g., a pre-allocated superblock) is split into an allocated block 508-1 (e.g., to store data) and a remaining pre-allocated block 506-3.

FIG. 6D illustrates the allocation process, implemented as the::allocate( ) function (e.g., FIGS. 6A and 6C) and a process 606 for relocating a superblock to make space for a block of data (e.g., wherein the requested_size input for the block of data is a size of the block of data). For example, the first portion of the process 606 (e.g., the left side of the flowchart) selects the best-fitting block by iterating over all superblocks and selecting the best fitting block within each superblock, comparing it with the best block found so far. If no fitting block can be found, the function progresses to the second portion of the method 606 (e.g., the right side of the flowchart). In the second portion of the method 606, the function iterates over each superblock and calls the function::relocate( ) to see whether allocated blocks within superblocks can be relocated to create a space that can accommodate the requested size.

In some embodiments, the global variable global_relocating is set to True while executing the process 606 until, at the end of the function, the variable is reset to False. This prevents the ::allocate( ) function from recursively calling ::relocate( ) The ::relocate( ) function calls ::allocate( ) to perform its allocations.

Figure 6E:
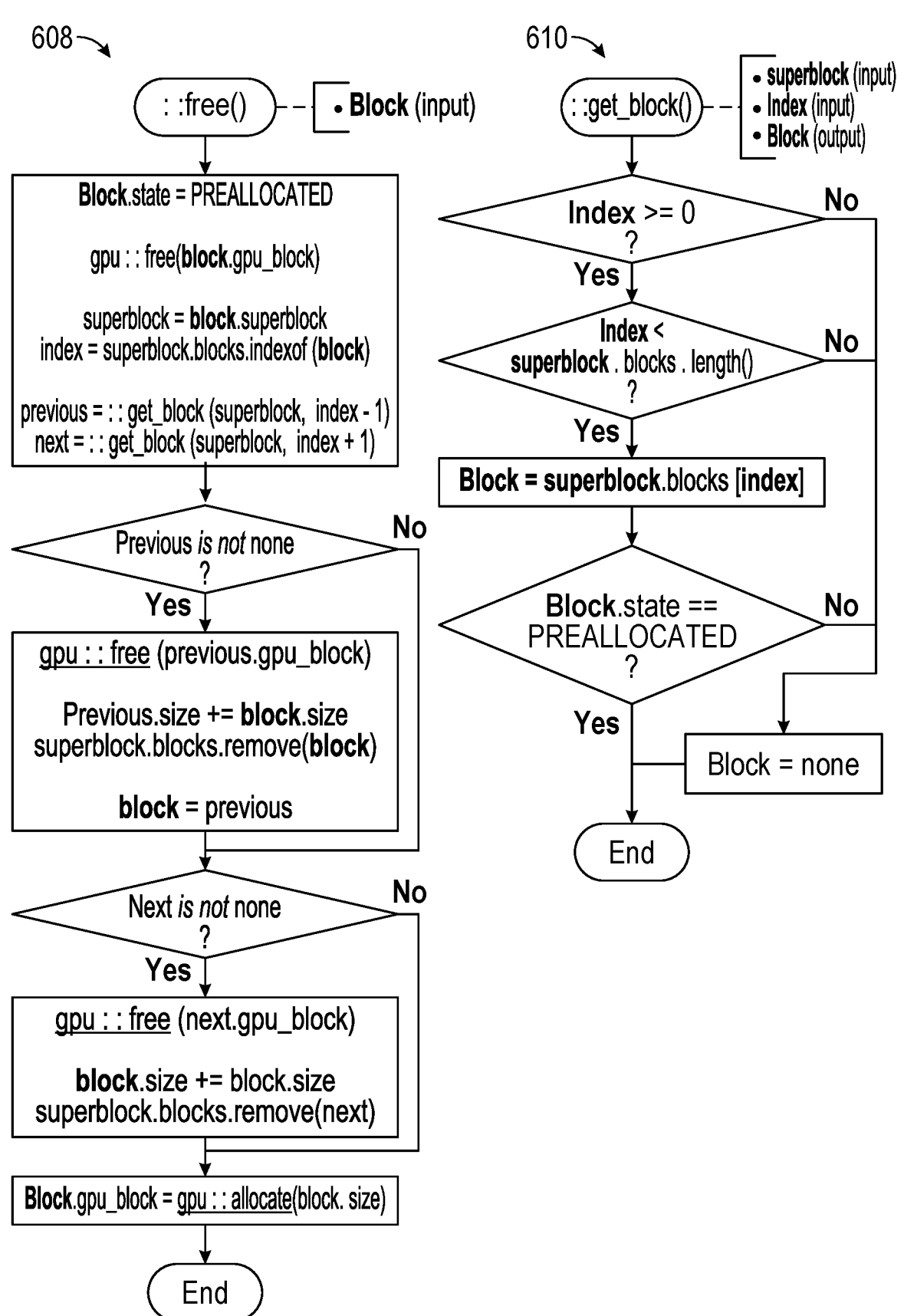

FIG. 6E illustrates a method 608 diagram for freeing a pre-allocated block (e.g., using the ::free( ) function). For example, the block that is identified as an input is pre-allocated, and the device determines whether the previous block has been freed. For example, the ::free( ) function marks a block as PREALLOCATED, and checks whether it can be merged with its neighbors. FIG. 6E further depicts a method 610 for using the ::get_block( ) utility function that checks whether an index is within range and whether the respective block is in the PREALLOCATED state or not.

Figure 6F:
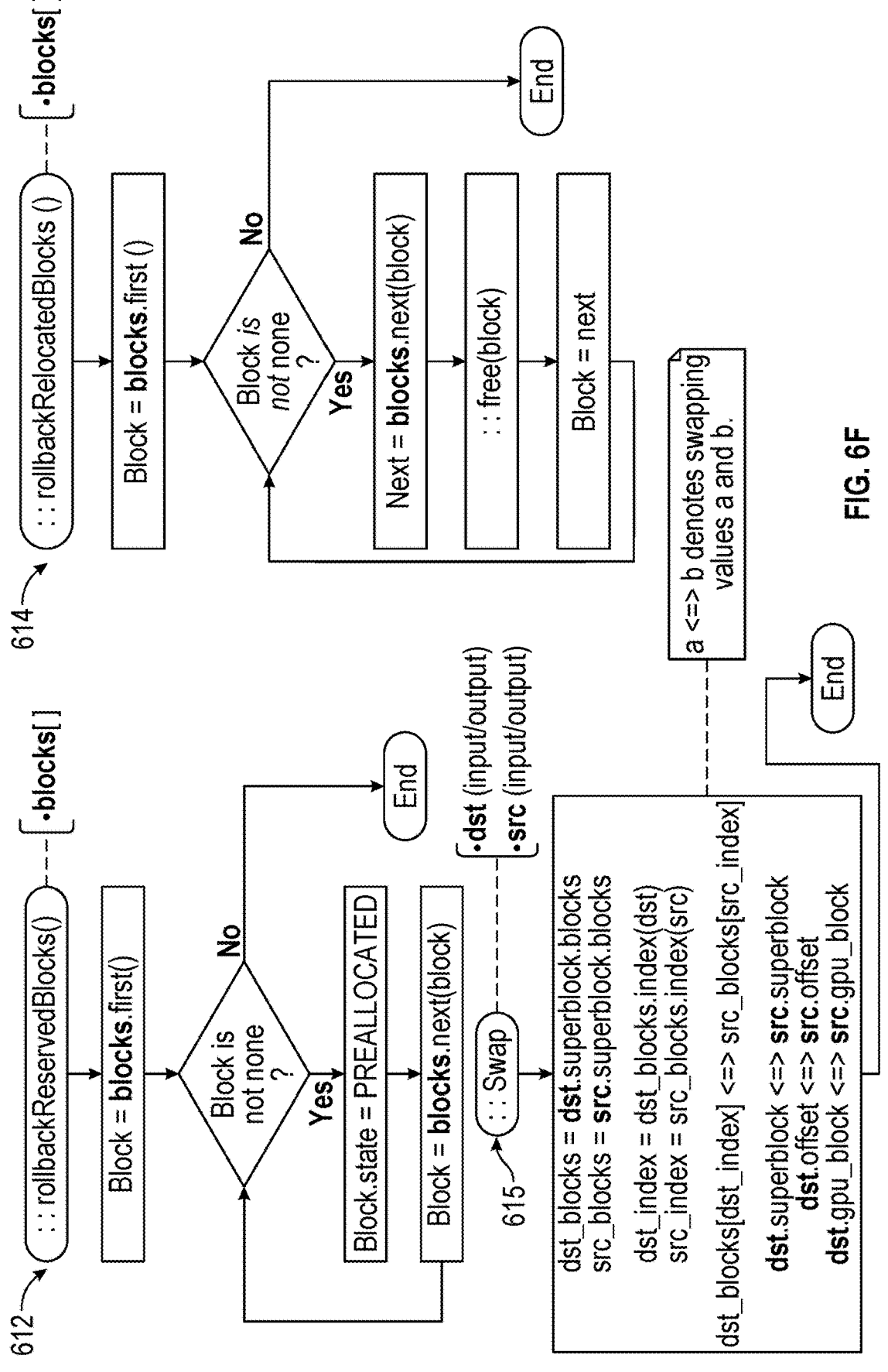

FIG. 6F illustrates two rollback utility functions for the relocate process, including ::rollbackReservedBlocks( ) illustrated as method 612 and ::rollbackRelocatedBlocks( ) illustrated as method 614. For example, the device either marks a respective block on the passed blocks list as PREALLOCATED, or frees the respective block. The ::swap( ) function illustrated in method 615 swaps two blocks between their places in the superblock's block list (e.g., map), and subsequently swaps, for each of the blocks, the block's parent superblocks, offset and gpu block allocation. As such, the references for each of the blocks are swapped, but the respective block's original properties remain in place. It will be understood that various other methods for remapping may also be used. For example, a third-party application maintains a reference for respective blocks storing respective data, and the third-party application can continue referring to the reference.

Figure 6G:
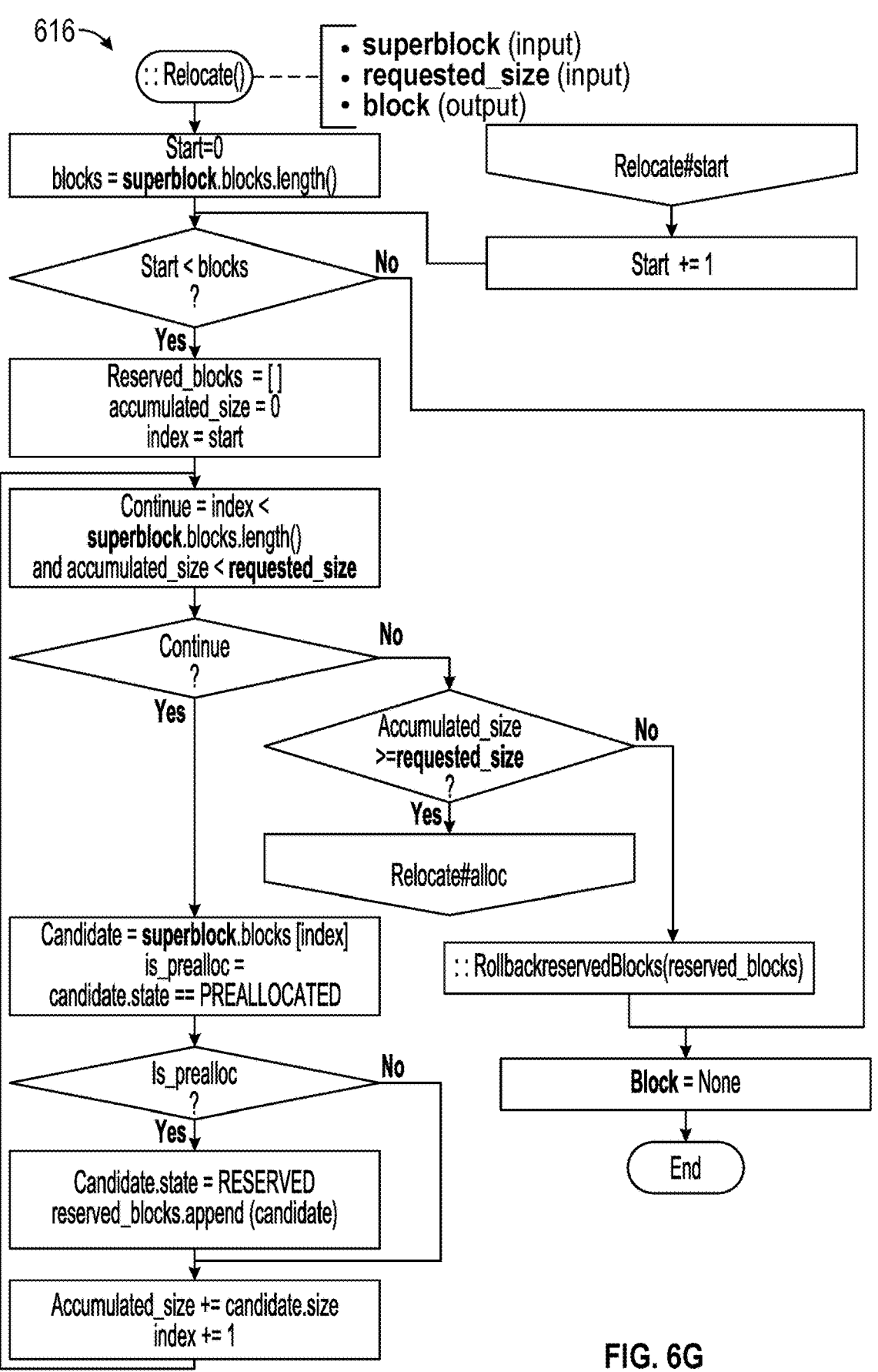
Figure 6H:
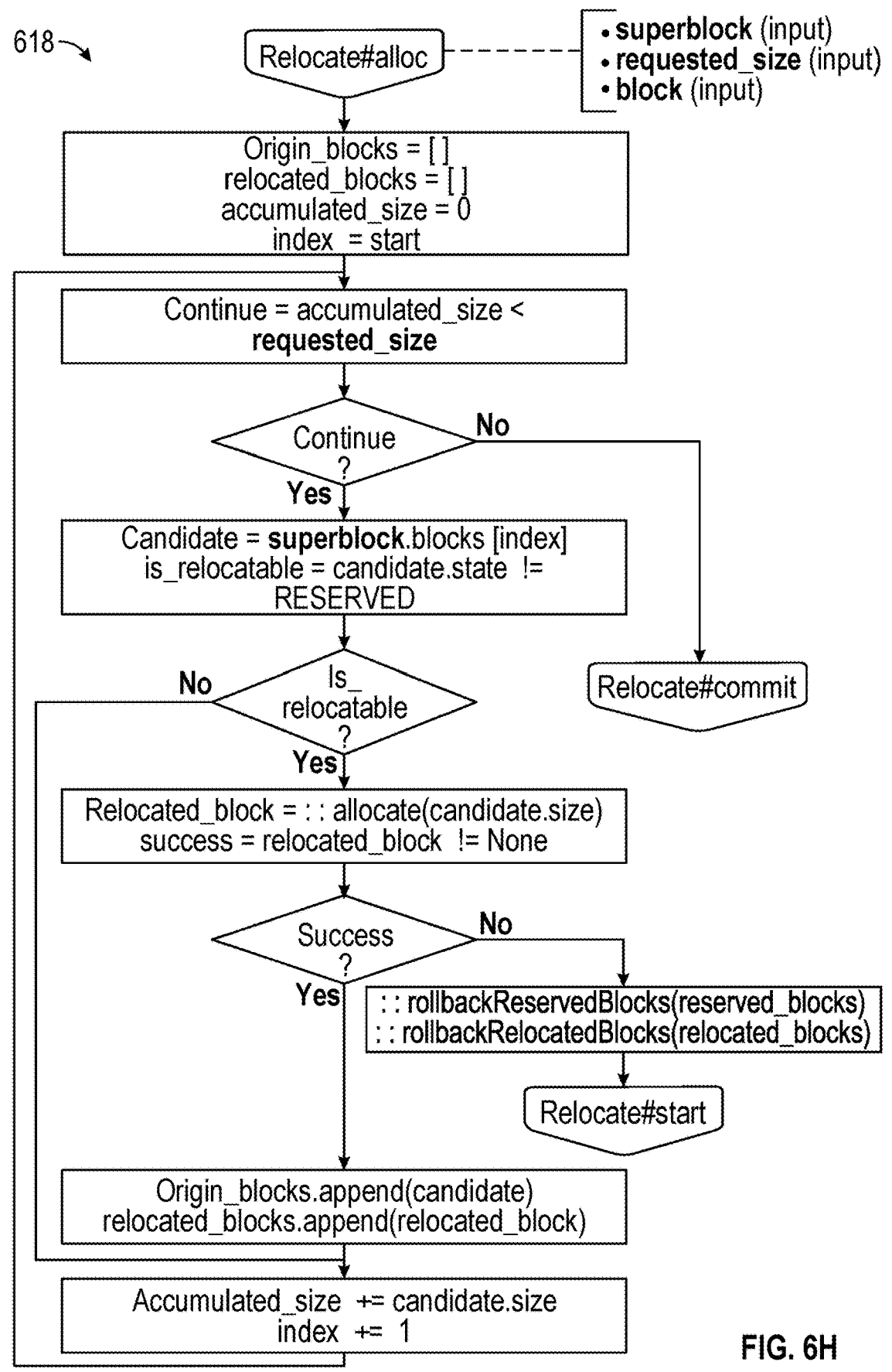
Figure 6I:
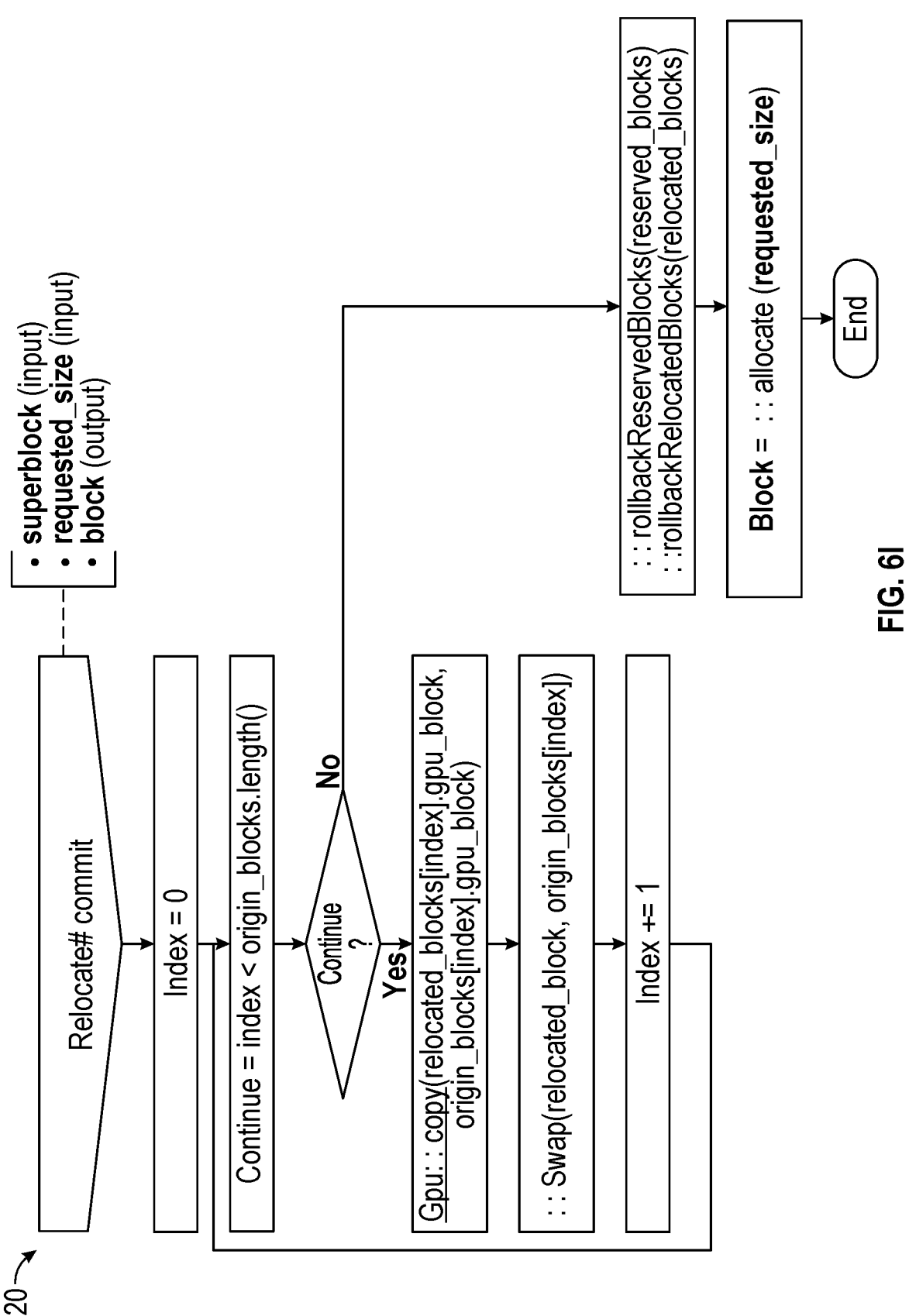

FIGS. 6G-6I illustrate a method 616 for relocating data stored in a block to another portion of the memory (e.g., using the ::relocate( ) function). Sub functions are specified as ::relocate #alloc( ) and ::relocate #commit( ). The relocation process consists of a main loop that starts from index 0 in the superblock's block list and traverses the list until all blocks have been used as a starting point. Within the main loop are various sub-loops that implement the phases of the relocation process: Scan & reserve, Relocate and Commit.

The scan phase, illustrated in FIG. 6G, starts at the block with index denoted by the 'start' variable and iterates the following blocks until the capacity of the blocks scanned is equal to or larger than the requested size. Blocks with state PREALLOCATED are marked as RESERVED so that the :: allocate( ) function will not consider them for allocation. Once the loop terminates, either because the accumulated space is equal to or larger than the requested space, or the loop runs out of blocks to accumulate, it is determined whether enough space has been accumulated. If not, all reservations are rolled-back and a None block is returned. If enough space was found, the process continues to ::relocate #alloc( ) illustrated in FIG. 6H.

FIG. 6H specifies how the relocate phase tries to allocate alternative space for the accumulated blocks that were marked as ALLOCATED. It is a loop that restarts at the index specified by 'start' and runs until accumulated_size once more reaches requested_size. Blocks marked as PRE-ALLOCATED are skipped in this phase. If an allocation fails, everything is rolled-back the function returns to the main loop, increasing start by 1. If alternative allocations for all ALLOCATED blocks could be found, the function progresses to ::relocate #commit( ) illustrated in FIG. 6I.

FIG. 6I specifies a loop that copies on the GPU the origin blocks to the relocated blocks and swaps both blocks. Once everything has been committed, the reserved blocks and relocated blocks (which were the origin blocks) are rolled back, resulting in one block with state PREALLOCATED that is guaranteed to be large enough to accommodate the requested size. The process ::relocate #commit( ) phase terminates by calling :: allocate( ) to allocate that space and returning it as the function's 'block' result.

FIG. 7 illustrates a method 700 for a server to manage the GPU memory of a remote client device. In some embodiments, the method 700 is performed by a server computer system 300 that hosts (702) one or more virtual client devices (e.g., VCVMs) executing one or more virtual applications (e.g., application 105), each virtual client device corresponding to a remote physical client device, as shown in FIG. 1. For example, instructions for performing the method are stored in the memory 306 and executed by the processor(s) 302 of the server computer system 300. Some operations described with regard to the method 700 are, optionally, combined and/or the order of some operations is, optionally, changed. The server computer system (e.g., a server computing device) has one or more processors and memory storing one or more programs for execution by the one or more processors. In some embodiments, each physical client device is a thin client programmed to remote into a server-based computing environment. In some embodiments, each physical client device includes GPU memory.

It will be understood that, in some embodiments, the memory management system described with reference to FIGS. 5A-5E and 6A-6I is not implemented in the client-server environment described with reference to FIGS. 1-4. For example, the methods described herein are used for memory management for other types of devices (e.g., non-GPU client memory, memory for other devices) within a different architecture than the one described with reference to FIG. 1.

In performing the method 700, the server initializes (704), for the third-party application, an entirety of available GPU memory of the client device, including pre-allocating a plurality of blocks of GPU memory. In some embodiments, the middleware of the client has a fixed amount of storage available for its own use, and the server controls the rest of it.

During execution of the third-party application (706), the server receives (708) a first request from the third-party application to store first data in the GPU memory of the client device. For example, in FIG. 5C, the block 508-1 needs to be stored in the GPU memory (e.g., so that the third-party application can access and/or display the data stored in block 508-1).

In response to the first request (710), the server frees (712) a portion of a respective pre-allocated block of the plurality of pre-allocated blocks of GPU memory. The server stores (714) the first data in the portion of the respective pre-allocated block and pre-allocates (716) a new block of GPU memory of the client device, the new block comprising a complementary portion of the respective pre-allocated block such that, after pre-allocating the new block of GPU memory, the entirety of available GPU memory of the client device remains allocated. For example, the pre-allocated block 504-2 is freed as block 509 in FIG. 5C before the system divides freed block 509 into a portion for storing block 508-1 and complementary portion 506-3. In some embodiments, the server forgoes pre-allocating a new block of GPU memory of the client device in accordance with a determination that the first data stored in the portion of the respective pre-allocated block has occupied the entirety of the respective pre-allocated block (e.g., the first data is the same size as the pre-allocated block), such that no complementary portion remains available to be pre-allocated by the server.

In some embodiments, the server stores a map of pre-allocated blocks, the map including an identifier and size of each of the plurality of pre-allocated blocks. In some embodiments, in response to the first request from the third-party application to store the first data in the GPU memory of the client device, the server updates the map to include the pre-allocated new block of memory. For example, the server continues to update the map as additional and/or new data is stored in the GPU memory of the client device. In some embodiments, the server continues to store the original map of pre-allocated superblocks (e.g., such that the server can continue moving data and freeing larger continuous blocks to fit larger blocks of data in the memory, as described with reference to FIG. 5D.

In some embodiments, the pre-allocated blocks have a maximum size. For example, the initial maximum allocation size is predefined (e.g., as an input), as described with reference to FIG. 6A.

In some embodiments, the pre-allocated blocks do not include data for the third-party application. For example, the server stores dummy data or otherwise pre-allocates the blocks with data that is not accessed or stored by the third-party application. For example, as described with reference to FIG. 5A, before storing any data for the third-party application, the server generates an initial map by pre-allocating the entirety of the available GPU memory of the client device.

In some embodiments, the server determines a position, within the respective pre-allocated block, of the portion of the respective pre-allocated block in which the first data is stored using a known management scheme of the physical client device. For example, the server continues to update the map of where various media assets (e.g., data) are stored within the pre-allocated blocks of memory so that the server is enabled to instruct the client on where to retrieve the respective media asset.

In some embodiments, pre-allocating the plurality of blocks of GPU memory comprises iteratively pre-allocating blocks of decreasing size until the entirety of the GPU memory is pre-allocated (e.g., as described with reference to FIG. 5B and FIG. 6A).

In some embodiments, the server receives a second request from the third-party application to store second data in the GPU memory of the client device, and in response to the second request, determines that the second data is larger than any currently pre-allocated blocks of GPU memory. In some embodiments, in accordance with the determination that the second data is larger than any currently pre-allocated blocks of GPU memory, the server moves the first data to a different pre-allocated block (e.g., including freeing the different pre-allocated block, storing the first data in a portion of the memory free by the different pre-allocated block, etc.) and stores the second data in GPU memory freed by moving the first data to the different pre-allocated block. For example, as described with reference to FIG. 5D, the server rearranges the stored data to generate a continuous block of memory 506-6 that is large enough to store the data of block 508-5.

In some embodiments, the physical client device does not include a memory manager for the GPU memory (e.g., as described with reference to FIG. 5A, the client device does not have an MMU).

As such, in some embodiments, the server manages the GPU memory of the physical client device by initializing an entirety of the available GPU memory into pre-allocated blocks and, as memory is needed, freeing respective pre-allocated blocks and allocating complementary portions of the freed memory such that the entirety of the GPU memory remains allocated.

It will be understood that, although the terms "first," "second," etc. may be used herein to describe various elements, these elements should not be limited by these terms. These terms are only used to distinguish one element from another.

The terminology used herein is for the purpose of describing particular embodiments only and is not intended to be limiting of the claims. As used in the description of the embodiments and the appended claims, the singular forms "a," "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

The foregoing description, for purpose of explanation, has been described with reference to specific embodiments. However, the illustrative discussions above are not intended to be exhaustive or to limit the claims to the precise forms disclosed. Many modifications and variations are possible in view of the above teachings. The embodiments were chosen and described in order to best explain principles of operation and practical applications, to thereby enable others skilled in the art.

What is claimed is:

1. A method, comprising:
at a server system hosting a virtual machine executing a third-party application, the server system in communication with a physical client device:

initializing, for the third-party application, an entirety of available GPU memory of the client device, including pre-allocating a plurality of blocks of GPU memory;

during execution of the third-party application:

receiving a first request from the third-party application to store first data in the GPU memory of the client device;

in response to the first request:

freeing a portion of a respective pre-allocated block of the plurality of pre-allocated blocks of GPU memory;

storing the first data in the portion of the respective pre-allocated block; and pre-allocating a new block of GPU memory of the client device, the new block comprising a complementary portion of the respective pre-allocated block such that, after pre-allocating the new block of GPU memory, the entirety of available GPU memory of the client device remains allocated.

2. The method of claim 1, further comprising:

storing a map of pre-allocated blocks, the map including an identifier and size of each of the plurality of pre-allocated blocks; and in response to the first request from the third-party application to store the first data in the GPU memory of the client device, updating the map to include the pre-allocated new block of memory.

3. The method of claim 1, wherein the pre-allocated blocks have a maximum size.

4. The method of claim 1, wherein the pre-allocated blocks do not include data for the third-party application.

5. The method of any of claims 1-4, further including determining a position, within the respective pre-allocated block, of the portion of the respective pre-allocated block in which the first data is stored using a known management scheme of the physical client device.

6. The method of any of claims 1-4, wherein pre-allocating the plurality of blocks of GPU memory comprises iteratively pre-allocating blocks of decreasing size until the entirety of the GPU memory is pre-allocated.

7. The method of any of claims 1-4, further comprising:

receiving a second request from the third-party application to store second data in the GPU memory of the client device;

in response to the second request:

determining that the second data is larger than any currently pre-allocated blocks of GPU memory;

in accordance with the determination that the second data is larger than any currently pre-allocated blocks of GPU memory, moving the first data to a different pre-allocated block; and storing the second data in GPU memory freed by moving the first data to the different pre-allocated block.

8. The method of any of claims 1-4, wherein the physical client device does not include a memory manager for the GPU memory.

9. A non-transitory computer-readable storage medium storing one or more programs for execution by a server system executing a third-party application, the server system in communication with a client device, the one or more programs including instructions for:

initializing, for the third-party application, an entirety of available GPU memory of the client device, including pre-allocating a plurality of blocks of GPU memory;

during execution of the third-party application:

receiving a first request from the third-party application to store first data in the GPU memory of the client device;

in response to the first request:

freeing a portion of a respective pre-allocated block of the plurality of pre-allocated blocks of GPU memory;

storing the first data in the portion of the respective pre-allocated block; and pre-allocating a new block of GPU memory of the client device, the new block comprising a complementary portion of the respective pre-allocated block such that, after pre-allocating the new block of GPU memory, the entirety of available GPU memory of the client device remains allocated.

10. A server system hosting a virtual machine executing a third-party application, the server system in communication with a physical client device, comprising:

one or more processors; and memory storing one or more programs for execution by the one or more processors, the one or more programs including instructions for:

initializing, for the third-party application, an entirety of available GPU memory of the client device, including pre-allocating a plurality of blocks of GPU memory;

during execution of the third-party application:

receiving a first request from the third-party application to store first data in the GPU memory of the client device;

in response to the first request:

freeing a portion of a respective pre-allocated block of the plurality of pre-allocated blocks of GPU memory;

storing the first data in the portion of the respective pre-allocated block; and pre-allocating a new block of GPU memory of the client device, the new block comprising a complementary portion of the respective pre-allocated block such that, after pre-allocating the new block of GPU memory, the entirety of available GPU memory of the client device remains allocated.

\* \* \* \* \*